United States Patent
Hatakeyama et al.

(10) Patent No.: US 10,717,804 B2
(45) Date of Patent: Jul. 21, 2020

(54) SILICON-CONTAINING COMPOUND, URETHANE RESIN, STRETCHABLE FILM, AND METHOD FOR FORMING THE SAME

(71) Applicant: SHIN-ETSU CHEMICAL CO., LTD., Tokyo (JP)

(72) Inventors: Jun Hatakeyama, Joetsu (JP); Shiori Nonaka, Joetsu (JP); Yuji Harada, Joetsu (JP); Ryo Mitsui, Joetsu (JP); Osamu Watanabe, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 4 days.

(21) Appl. No.: 16/123,697

(22) Filed: Sep. 6, 2018

(65) Prior Publication Data
US 2019/0106528 A1 Apr. 11, 2019

(30) Foreign Application Priority Data
Oct. 10, 2017 (JP) .................... 2017-197255

(51) Int. Cl.
*C08G 18/73* (2006.01)
*C08G 18/38* (2006.01)
(Continued)

(52) U.S. Cl.
CPC ........ *C08G 18/3893* (2013.01); *C07F 7/0838* (2013.01); *C07F 7/0879* (2013.01);
(Continued)

(58) Field of Classification Search
None
See application file for complete search history.

(56) References Cited

U.S. PATENT DOCUMENTS 3,381,019 A * 4/1968 Morchouse ............ C08J 9/0061
549/214
4,839,443 A * 6/1989 Akutsu .............. C08G 18/3893
525/474
(Continued)

FOREIGN PATENT DOCUMENTS

JP H05-097868 A 4/1993
JP 2583412 B2 2/1997
(Continued)

OTHER PUBLICATIONS

Konig et al. "A Simple Post-Polymerization Modification Method for Controlling Side-Chain Information in Digital Polymers" Angew. Chem. Int. Ed. 2017, 56, 7297-7301. (Year: 2017).*
(Continued)

*Primary Examiner* — Robert S Loewe
(74) *Attorney, Agent, or Firm* — Oliff PLC

(57) ABSTRACT

The present invention provides a silicon-containing compound shown by the following formula (1):

(1)

(Continued)

wherein $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by $-(OSiR^7R^8)_n-OSiR^9R^{10}R^{11}$; $R^7$, $R^8$, $R^9$, $R^{10}$, and $R^{11}$ have the same meanings as $R^1$ to $R^6$; X represents a linear or branched alkylene group having 3 to 7 carbon atoms optionally having an ether group; and "n" is an integer in the range of 0 to 100. This provides a stretchable film that has excellent stretchability and strength, with the film surface having excellent repellency, and a method for forming the same; as well as a urethane resin used for the stretchable film; and a silicon-containing compound to be a material of the urethane resin.

13 Claims, 6 Drawing Sheets

(51) Int. Cl.

| | | |
|---|---|---|
| *C08G 18/75* | (2006.01) | |
| *C08G 18/76* | (2006.01) | |
| *C08G 18/79* | (2006.01) | |
| *C08J 5/18* | (2006.01) | |
| *C07F 7/08* | (2006.01) | |
| *C09D 175/16* | (2006.01) | |
| *C08G 77/458* | (2006.01) | |
| *C08G 18/61* | (2006.01) | |
| *H04B 1/3827* | (2015.01) | |

(52) U.S. Cl.
CPC ............ *C08G 18/61* (2013.01); *C08G 18/73* (2013.01); *C08G 18/755* (2013.01); *C08G 18/758* (2013.01); *C08G 18/7614* (2013.01); *C08G 18/797* (2013.01); *C08G 77/458* (2013.01); *C08J 5/18* (2013.01); *C09D 175/16* (2013.01); *C08J 2375/04* (2013.01); *H04B 1/385* (2013.01)

(56) References Cited

U.S. PATENT DOCUMENTS

| | | | | |
|---|---|---|---|---|
| 8,778,457 B2* | 7/2014 | Huggins | ................ | C08L 83/06 |
| | | | | 427/387 |
| 8,859,710 B2* | 10/2014 | Keuk | .................... | C08G 18/61 |
| | | | | 525/474 |
| 2015/0004406 A1 | 1/2015 | Suzuki et al. | | |

FOREIGN PATENT DOCUMENTS

| | | | |
|---|---|---|---|
| JP | 2624060 B2 | 6/1997 | |
| JP | 2004-033468 A | 2/2004 | |
| JP | 2011-194757 A | 10/2011 | |
| JP | 2012-152725 A | 8/2012 | |
| JP | 2013-139534 A | 7/2013 | |
| NL | 6409949 A | 3/1965 | |

OTHER PUBLICATIONS

Jan. 25, 2019 Extended Search Report issued in European Patent Application No. 18199408.8.

Oct. 11, 2019 Office Action issued in Korean Patent Application No. 10-2018-0119884.

* cited by examiner

SILICON-CONTAINING COMPOUND, URETHANE RESIN, STRETCHABLE FILM, AND METHOD FOR FORMING THE SAME

TECHNICAL FIELD

The present invention relates to a stretchable film that combine stretchability, strength, and repellency, and a method for forming the same; as well as a urethane resin used for the stretchable film; and a silicon-containing compound to be a material of the urethane resin.

BACKGROUND ART

In recent years, wearable devices have been developed progressively with the spread of Internet of Things (IoT). Representative examples thereof include a watch and glasses that can be connected with internet. Wearable devices that can always monitor physical conditions are also necessary in a medical field and a sports field, and are expected to be a growth field in the future.

Wearable devices include a form that is adhered to a body to monitor physical conditions constantly. Such a wearable device is generally composed of a bio-electrode to detect electric signals from a body, wiring to send the electric signals to a sensor, a semiconductor chip to be the sensor, and a battery. Normally, an adhesive pad is necessary to be adhered to skin. The structures of a bio-electrode, wiring around the same, and an adhesive pad are specifically described in Patent Literature 1. In the wearable device described in Patent Literature 1, a silicone based adhesive film is disposed around the bio-electrode, and the bio-electrode is connected with a sensor device by stretchable silver wiring in the shape of bellows coated with a stretchable urethane film.

Urethane films have high stretchability and strength to possess excellent mechanical properties as coating films for stretchable wiring. The urethane film, however, has hydrolytic properties to cause degradation, thereby inducing a disadvantage of lowering the stretchability and the strength due to hydrolysis. On the other hand, silicone films are free from hydrolytic properties, but has a disadvantage of lower strength.

Accordingly, it has been conducted to investigate silicone-urethane polymers with each polymer main chain having both of a urethane bond and a siloxane bond. The oared product of this polymer has higher strength than single silicone, and lower hydrolytic properties than single polyurethane. The cured product of this polymer, however, fails to equal the strength of single polyurethane and the repellency of single silicone, only giving strength and repellency in the middle of those of silicone and polyurethane.

On the other hand, a material in which polyurethane and silicone are blended has been investigated. For example, Patent Literature 2 and Patent Literature 3 describe a material in which non-reactive silicone and crosslinkable polyurethane are blended. In a film formed from such a material, silicone comes up to the surface of a cured polyurethane film (bleed out) to improve the repellency of the film surface. In such a film, however, the silicone is not crosslinked, which causes peeling of silicone on the film surface to be tend to lower the repellency. Additionally, without a surface, the silicone does not come up to the surface of the film. Accordingly, a compression molded material in which the film is sandwiched between sheets does not show high repellency.

Additionally, a diol material has been proposed for synthesizing polyurethane having a siloxane side chain. Patent Literatures 4 and 5 each describe a diol compound for forming polyurethane in which silicone is attached to the side chain. The side chain silicone group shown therein is a linear silicone in which the siloxane terminal is bonded to the diol compound.

CITATION LIST

Patent Literature

Patent Literature 1: Japanese Patent Laid-open Publication No. 2004-033468
Patent Literature 2: Japanese Patent Laid-Open Publication No. 2011-194757
Patent Literature 3: Japanese Patent. Laid-open Publication No. 2013-139534
Patent Literature 4: Japanese Patent No. 2583412
Patent Literature 5: Japanese Patent No. 2624060

SUMMARY OF THE INVENTION

Technical Problem

In view of these backgrounds, it has been demanded for developing a stretchable film that has excellent stretchability and strength equal to those of polyurethane, together with excellent repellency equal to that of silicone, and a method for forming the same.

The present invention has been accomplished to solve the foregoing problems, and an object thereof is to provide a stretchable film that has excellent stretchability and strength, with the film surface having excellent repellency, and a method for forming the same; as well as a urethane resin used for the stretchable film; and a silicon-containing compound to be a material of the urethane resin.

Solution to Problem

To solve the problems, the present invention provides a silicon-containing compound shown by the following formula (1):

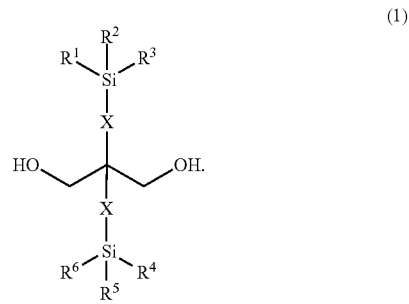

wherein $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by $-(OSiR^7R^8)_n-OSiR^9R^{10}R^{11}$; $R^7$, $R^8$, $R^9$, $R^{10}$, and $R^{11}$ have the same meanings as $R^1$ to $R^6$; "n" is an integer in the range of 0 to 100; and X represents a linear or branched alkylene group having 3 to 7 carbon atoms optionally having an ether group.

The inventive silicon-containing compound can be a material of a urethane resin used for a stretchable film, making it possible to form a stretchable film that has excellent stretchability and strength, with the film surface having excellent repellency.

The silicon-containing compound of the formula (1) is preferably shown by the following formula (2):

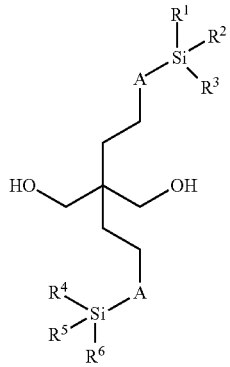

(2)

wherein $R^1$, $R^2$, $R^3$, $R^4$, $R^5$, and $R^6$ have the same meanings as defined above; and "A" represents a linear or branched alkylene group having 1 to 4 carbon atoms.

Having a structure like this, the silicon-containing compound of the formula (1) can be a material of a urethane resin used for a stretchable film, making it possible to form a stretchable film that has really excellent stretchability and strength, with the film surface having really excellent repellency.

The silicon-containing compound of the formula (1) is preferably shown by the following formula (3).

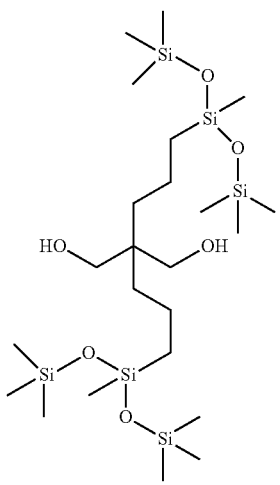

(3)

Having a structure like this, the silicon-containing compound of the formula (1) can be a material of a urethane resin used for a stretchable film, making it possible to form a stretchable film with more improved repellency.

The present invention also provides a urethane resin comprising a structure shown by the following formula (4):

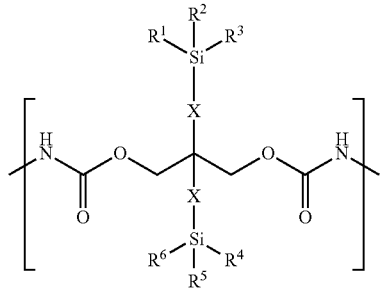

(4)

wherein $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by $-(OSiR^7R^8)_n-OSiR^9R^{10}R^{11}$; $R^7$, $R^8$, $R^9$, $R^{10}$, and $R^{11}$ have the same meanings as $R^1$ to $R^6$; "n" is an integer in the range of 0 to 100; and X represents a linear or branched alkylene group having 3 to 7 carbon atoms optionally having an ether group.

The inventive urethane resin is capable of forming a stretchable film that has excellent stretchability and strength, with the film surface having excellent repellency.

The structure shown by the formula (4) of the urethane resin is preferably shown by the following formula (5):

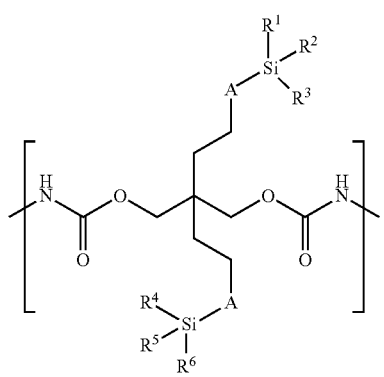

(5)

wherein $R^1$, $R^2$, $R^3$, $R^4$, $R^5$, and $R^6$ have the same meanings as defined above; and "A" represents a linear or branched alkylene group having 1 to 4 carbon atoms.

The urethane resin like this is capable of forming a stretchable film that has excellent stretchability and strength equal to or superior to those of polyurethane, with the film surface having excellent repellency and smooth touch with less stickiness.

The urethane resin preferably has a structure containing a (meth)acrylate group at a terminal thereof shown by the following formula (6):

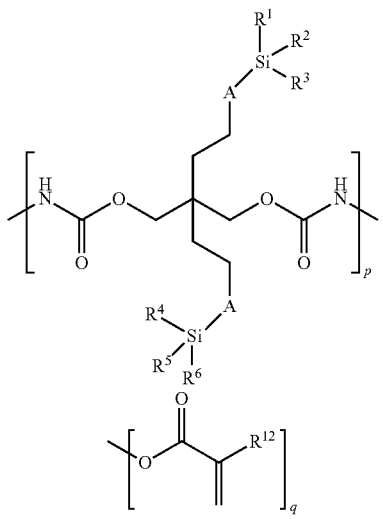

(6)

wherein $R^1$, $R^2$, $R^3$, $R^4$, $R^5$, $R^6$, and have the same meanings as defined above; $R^{12}$ represents a hydrogen atom or a methyl group; "p" and "q" each represent a number of unit in one molecule, and are integers in the range of $1 \leq p \leq 100$ and $1 \leq q \leq 3$.

The urethane resin like this is capable of forming a stretchable film that has excellent stretchability and strength, with the film surface having excellent repellency.

The present invention also provides a stretchable film comprising a cured material of a composition containing the urethane resin described above.

The inventive urethane resin-containing stretchable film provides excellent stretchability and strength, with the film surface having excellent repellency.

It is preferable that the stretchable film exhibit a stretching property of 40 to 1000% in a tensile test regulated by JIS K 6251.

Having such a stretching property, the stretchable film is usable for a coating film of a stretchable wiring particularly favorably.

It is preferable that the stretchable film is used as a film to be in contact with a conductive wiring having stretchability.

The inventive stretchable film is applicable to these uses particularly favorably.

The present invention also provides a method for forming a stretchable film, comprising:

mixing a compound shown by the following formula (1) and a compound having an isocyanate group to make a mixture,

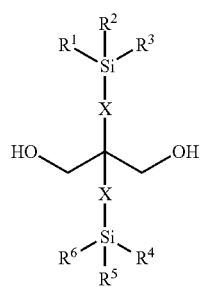

(1)

wherein $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by $-(OSiR^7R^8)_n-OSiR^9R^{10}R^{11}$; $R^7$, $R^8$, $R^9$, $R^{10}$, and $R^{11}$ have the same meanings as $R^1$ to $R^6$; "n" is an integer in the range of 0 to 100; and X represents a linear or branched alkylene group having 3 to 7 carbon atoms optionally having an ether group;

forming a film of the mixture; and
curing the film by heating.

The inventive method for forming a stretchable film makes it possible to easily produce a stretchable film that has excellent stretchability and strength, with the film, surface having excellent repellency.

In this method, the compound shown by the formula (1) is preferably a compound shown by the following formula (2):

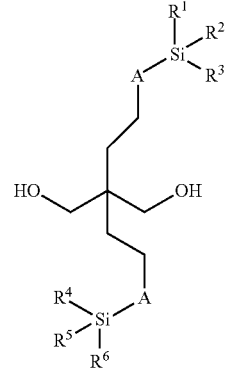

(2)

wherein $R^1$, $R^2$, $R^3$, $R^4$, $R^5$, and $R^6$ have the same meanings as defined above; and "A" represents a linear or branched alkylene group having 1 to 4 carbon atoms.

Using the silicon-containing compound of the formula (1) with such a structure, it is possible to easily produce a stretchable film that has excellent stretchability and strength, with the film surface having excellent repellency.

In the above method, the compound shown by the formula (1) is preferably a compound shown by the following formula (3).

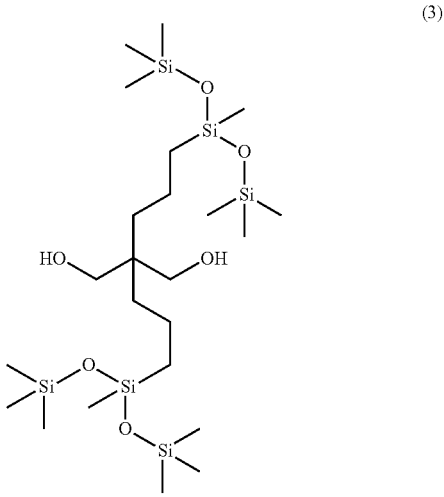

(3)

Using the silicon-containing compound of the formula (1) with such a structure, it is possible to easily produce a stretchable film with more improved repellency.

The present invention further provides a method for forming a stretchable film, comprising:

forming a film of a compound having a (meth)acrylate group at a terminal thereof shown by the following formula (6):

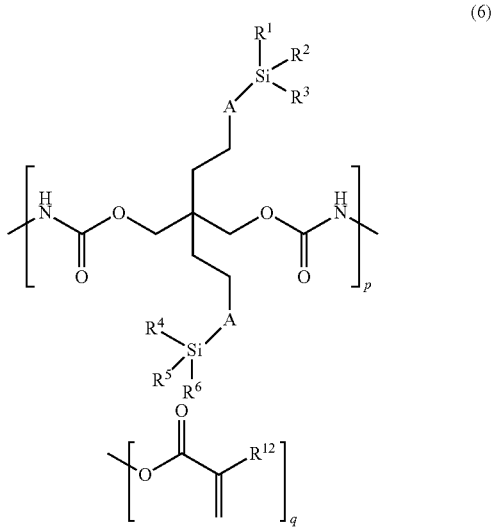

wherein $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by $-(OSiR^7R^8)_n-OSiR^9R^{10}R^{11}$; $R^7$, $R^8$, $R^9$, $R^{10}$, and $R^{11}$ have the same meanings as $R^1$ to $R^6$; "n" is an integer in the range of 0 to 100; "A" represents a linear or branched alkylene group having 1 to 4 carbon atoms; $R^{12}$ represents a hydrogen atom or a methyl group; "p" and "q" each represent a number of unit in one molecule, and are integers in the range of $1 \leq p \leq 100$ and $1 \leq q \leq 3$; and curing the film by heating and/or light irradiation.

In the inventive method for forming a stretchable film, it is possible to combine heat curing and photo-curing as described above.

Advantageous Effects of Invention

As described above, the inventive stretchable film exhibits excellent stretchability and strength equal to those of polyurethane, together with high repellency such that the film surface has excellent repellency that is equal to or superior to that of silicone having a main chain composed of siloxane bond. The inventive urethane resin is usable for such stretchable films favorably. Additionally, the inventive silicon-containing compound is usable for materials of such urethane resins. The inventive stretchable film is based on a urethane resin in which two silicon-containing groups are attached to the side chains. Accordingly, the repellency of the stretchable film is efficiently improved by the two silicon-containing groups attached to the side chains in small quantity, and the stretchability and strength of the stretchable film is successively improved by the urethane bond in the main chain. The two silicon-containing groups on the side chains usually face the surface side of the stretchable film, thereby making the repellency higher even when the stretchable film is formed in a sealed state in which the both sides of a composition for forming the stretchable film has been sandwiched between sheets, for example. When the stretchable film like this is brought into contact with a conductive wiring or used for coating a side or the both sides of a conductive wiring, the obtained stretchable wiring film has a surface with excellent repellency not only has excellent stretchability and strength. Accordingly, the inventive stretchable film is usable for a wearable device particularly suitably as a stretchable film that is capable of loading all of the bio-electrode(s) and the sensor(s) not only a wiring unit to connect the bio-electrode and the sensor. The inventive method for forming a stretchable film makes it possible to easily form a highly repellent stretchable film that has excellent stretchability and strength equal to those of polyurethane, with the film surface having excellent repellency that is equal to or superior to that of silicone having a main chain composed of siloxane bond.

DESCRIPTION OF EMBODIMENTS

Figure 1:
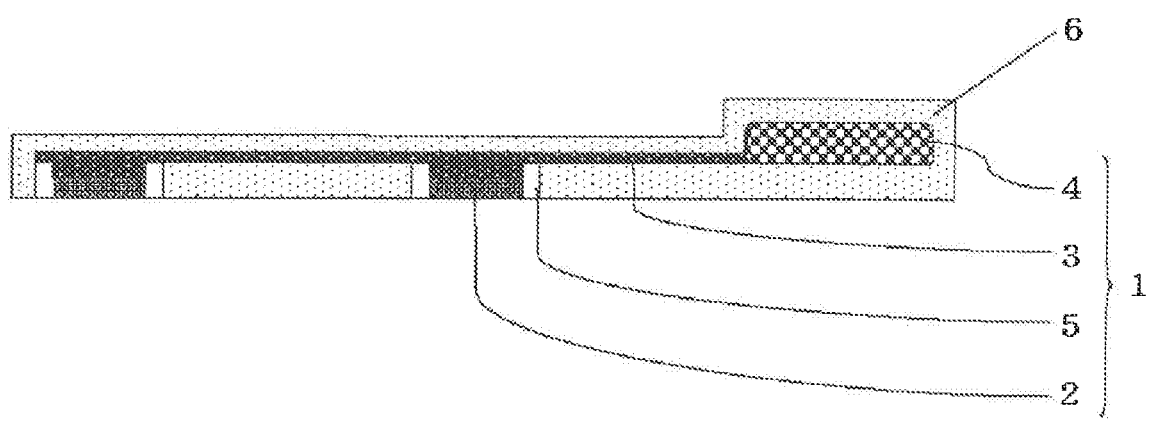
FIG. 1 is a sectional view showing an electrocardiograph in a state being coated with the inventive stretchable film.

As described above, polyurethane has a sufficient stretchability and strength, but also has a drawback of low repellency to lower the strength and stretchability due to hydrolysis; silicone has a drawback of lower strength although the repellency is high. The cured material of a silicone urethane polymer, which contains both of urethane bonds and siloxane bonds in the main chain, has a problem that the strength and repellency are in the middle of those of polyurethane and silicone, and inferior to the strength of polyurethane alone or the repellency of silicone alone. Additionally, in the method for forming a film with improved repellency by blending polyurethane and silicone followed by baking to unevenly distribute the silicone to the film surface, the film surface has lower strength, and the silicone does not come up to the surface of the film unless there is a surface, causing a drawback of unimproved repellency in a sealed state in which the film has been sandwiched between sheets, for example. Additionally, this method requires to blend a solvent with a boiling point in a range of 100 to 200° C. in order to accelerate the uneven distribution of the silicone to the surface, and fails to form a film without a solvent, causing a drawback such that the composition or film-forming process is limited. On the basis of these backgrounds, it has been required to develop a stretchable film that has excellent stretchability and strength equal to those of polyurethane, with the film surface having sufficiently high strength and surface hardness as well as excellent repellency that is equal to or superior to that of silicone, together with a method for forming the same.

Accordingly, the present inventors have diligently investigated to achieve the above objects. As a result, the inventors have found that the film based on a resin having a urethane bond in the main chain and two of highly repellent silicon-containing groups on the side chains is excellent in stretchability and strength while having high repellency, and forms a stretchable film that has excellent stretchability and strength equal to or superior to those of polyurethane with the film surface having excellent repellency that are equal to or superior to those of silicone, and is particularly favorable as a coating film of a stretchable wiring in a wearable device; thereby bringing the present invention to completion.

That is, the present inventors have found that the film composed of a resin having a urethane bond in the main chain with the two silicon-containing side chains has stretchability and strength equal to those of polyurethane, has high repellency, and is useful as a stretchable film for coating a bio-electrode.

That is, the present invention is a silicon-containing compound shown by the following formula (1):

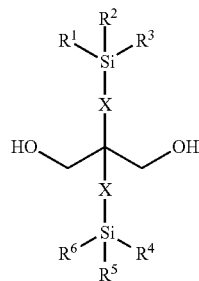

(1)

wherein $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by —$(OSiR^7R^8)_n$—$OSiR^9R^{10}R^{11}$; $R^7$, $R^8$, $R^9$, $R^{10}$, and $R^{11}$ have the same meanings as $R^1$ to $R^6$; "n" is an integer in the range of 0 to 100; and X represents a linear or branched alkylene group having 3 to 7 carbon atoms that may contain an ether group.

The present invention also provides a urethane resin comprising a structure shown by the following formula (4):

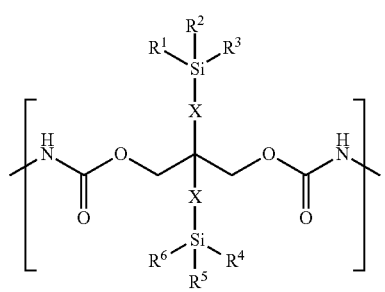

(4)

wherein $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by —$(OSiR^7R^8)_n$—$OSiR^9R^{10}R^{11}$; $R^7$, $R^8$, $R^9$, $R^{10}$, and $R^{11}$ have the same meanings as $R^1$ to $R^6$; "n" is an integer in the range of 0 to 100; and X represents a linear or branched alkylene group having 3 to 7 carbon atoms that may contain an ether group.

The present invention also provides a method for forming a stretchable film, comprising:

mixing a compound shown by the following formula (1) and a compound having an isocyanate group to make a mixture,

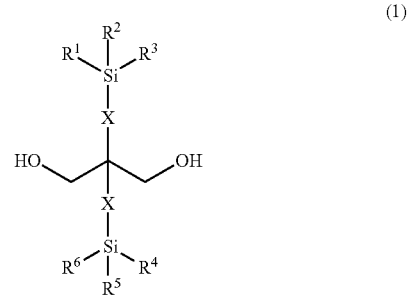

(1)

wherein $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by —$(OSiR^7R^8)_n$—$OSiR^9R^{10}R^{11}$; $R^7$, $R^8$, $R^9$, $R^{10}$, and $R^{11}$ have the same meanings as $R^1$ to $R^6$; "n" is an integer in the range of 0 to 100; and X represents a linear or branched alkylene group having 3 to 7 carbon atoms that may contain an ether group;

forming a film of the mixture; and
curing the film by heating.

Hereinafter, the present invention will be described specifically, but the present invention is not limited thereto.

<Silicon-Containing Compound>

The inventive silicon-containing compound is shown by the following formula (1).

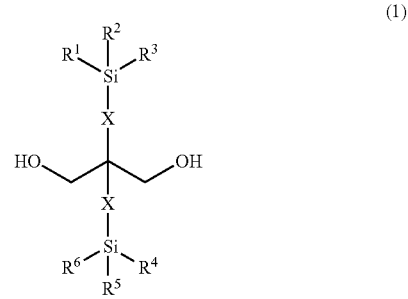

(1)

In the formula, $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by —$(OSiR^7R^8)_n$—$OSiR^9R^{10}R^{11}$; $R^7$, $R^8$, $R^9$, $R^{10}$, and $R^{11}$ have the same meanings as $R^1$ to $R^6$; "n" is an integer in the range of 0 to 100.

Illustrative examples of the alkyl group of $R^1$ to $R^{11}$ include a methyl group, an ethyl group, an n-propyl group, an n-butyl group, an isopropyl group, an isobutyl group, a tert-butyl group, at cyclobutyl group, a cyclopentyl group, and a cyclohexyl group.

In the formula, X represents a linear or branched alkylene group having 3 to 7 carbon atoms optionally having an ether group.

In the silicon-containing compound shown by the formula (1), each of the dialcohol moieties is primary, thereby having higher reactivity to isocyanate, making it possible to form a urethane bond easily. Another merit of using a silicon-containing compound that contains primary dialcohol is that the urethane bond formed by reaction with isocyanate has higher degree of freedom of rotation, which increases the hydrogen bonding tendency between the urethane bonds, thereby making it possible to form a film with improved strength.

Additionally, the inventive silicon-containing compound shown by the formula (1) is a diol compound having silicon-containing groups in two side chains thereof. The production method of the inventive silicon-containing compound is not particularly limited, but it can be obtained by the reaction of propanediol having two double bonds in the side chains and a silicon compound having SiH groups in the siloxane chain in the presence of a platinum catalyst, for example. The hydroxyl groups may be remained unprotected, but can be protected by trimethylsilyl groups or acid-labile groups previously, followed by deprotecting thereof after the reaction since hydroxyl groups sometimes lower the activity of platinum catalysts.

The synthesis method of propanediol having two double bonds in the side chains, which can be a raw material of the inventive silicon-containing compound, is not particularly limited and includes a method of reaction of diethyl malonate and alkenyl halide having 3 to 6 carbon atoms in the presence of base, followed by reduction of the ester with lithium aluminum hydride.

Incidentally, the inventive silicon-containing compound is preferably the one shown by the following formula (2).

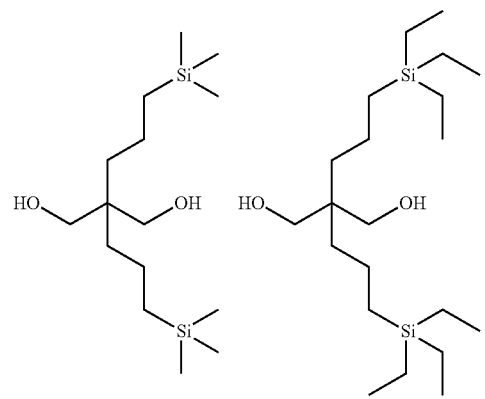

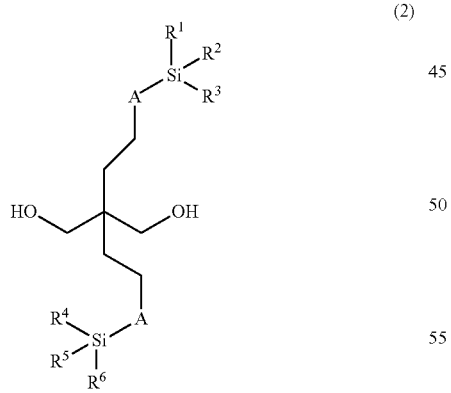

(2)

In the formula, $R^1$, $R^2$, $R^3$, $R^4$, $R^5$, and $R^6$ have the same meanings as defined above; and "A" represents a linear or branched alkylene group having 1 to 4 carbon atoms.

Illustrative examples of "A" include a methylene group, an ethylene group, a propylene group, and a butylene group.

Illustrative examples of the inventive silicon-containing compound specifically include the following, but are not limited thereto.

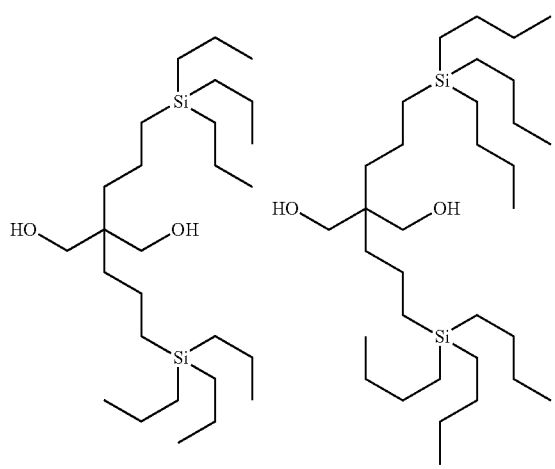

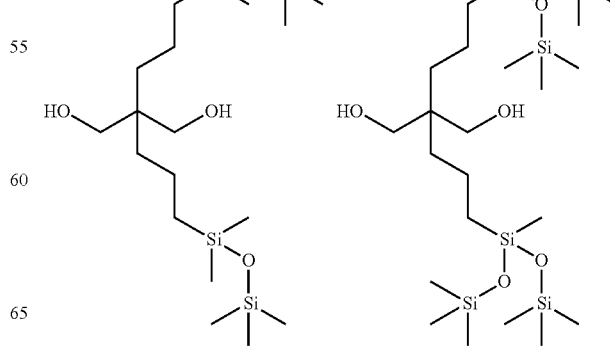

-continued
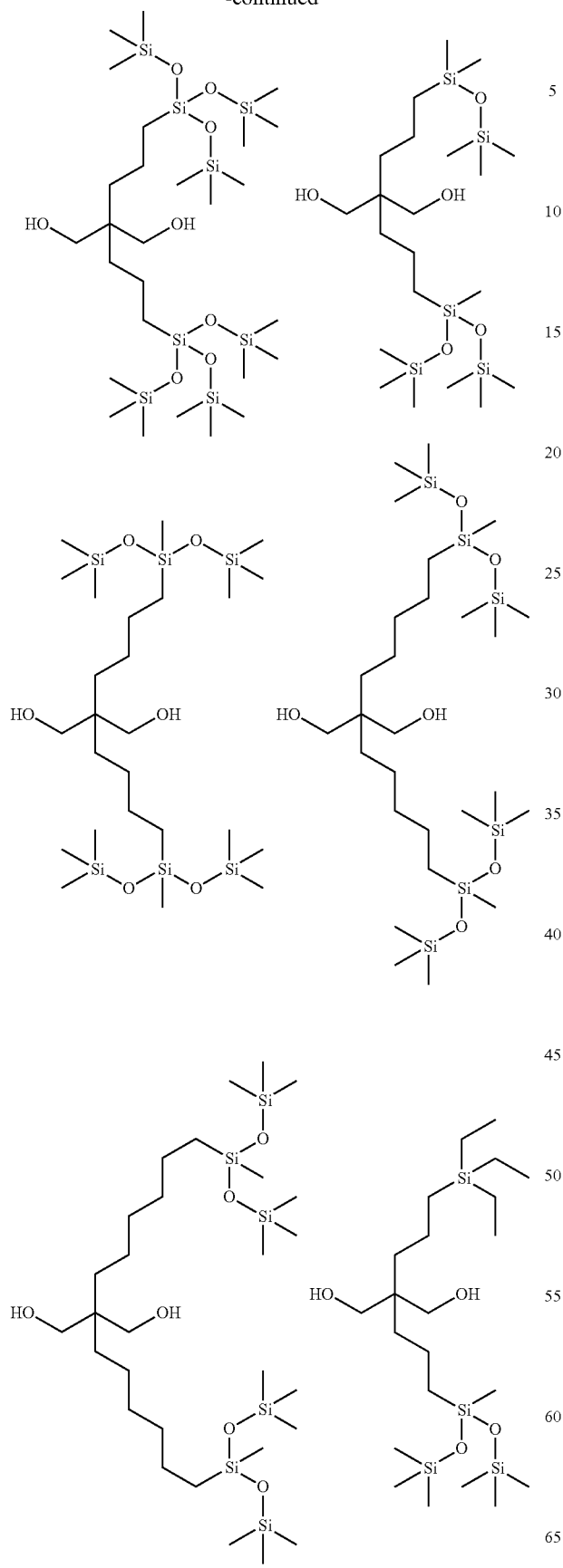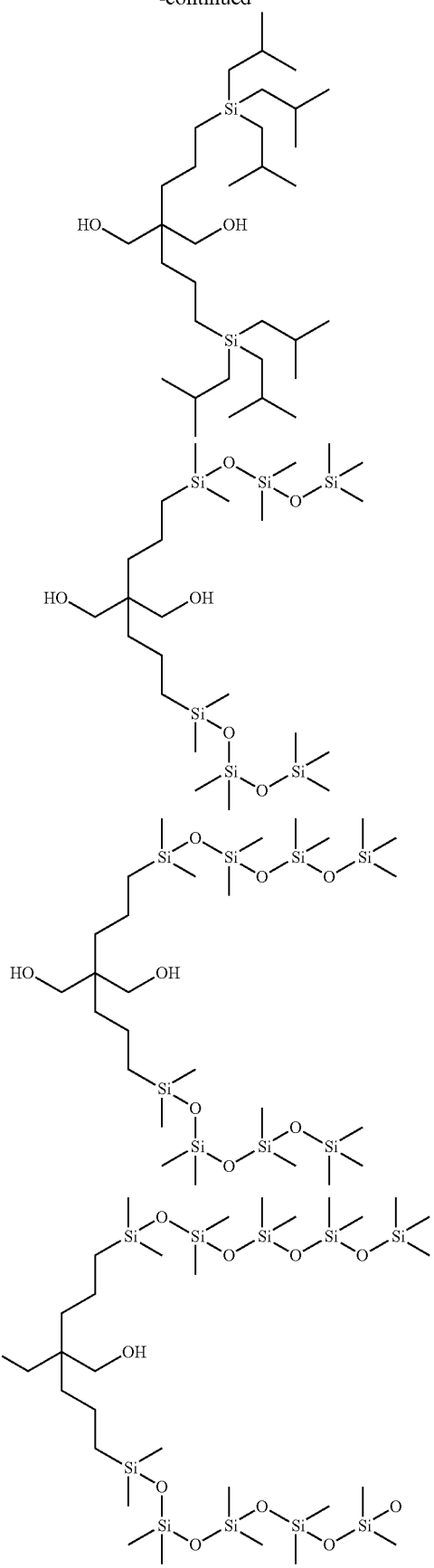

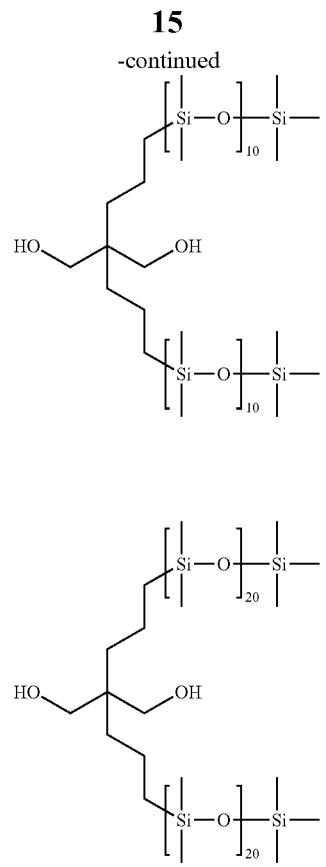
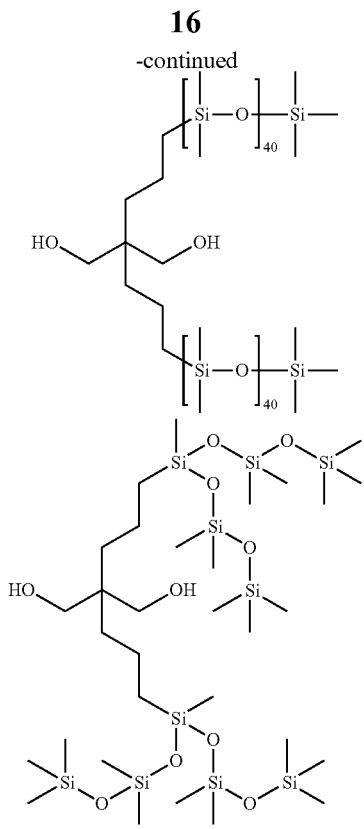
In the formulae, each repeating number represents the average value.
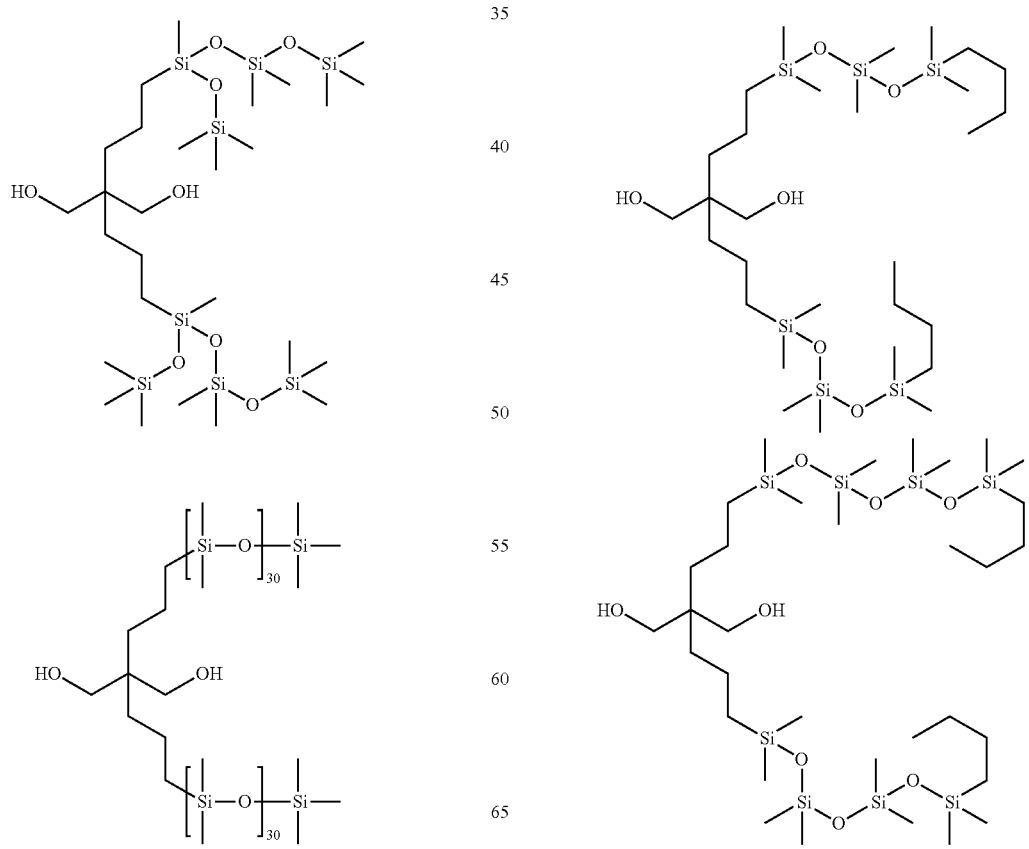

17
-continued
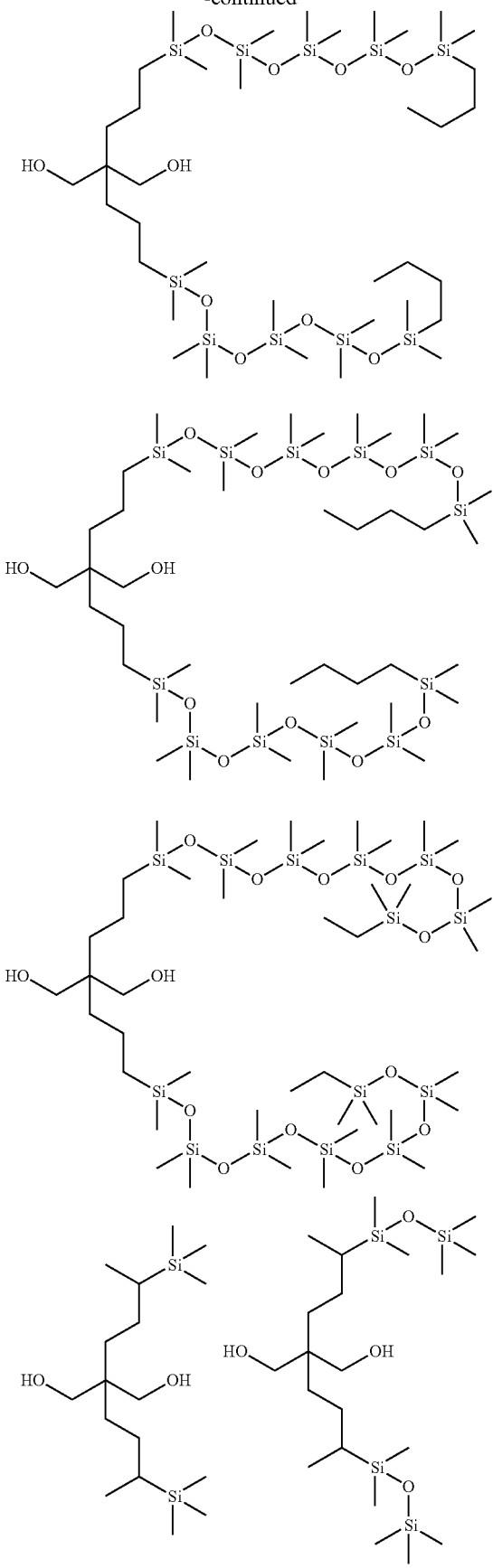
18
-continued
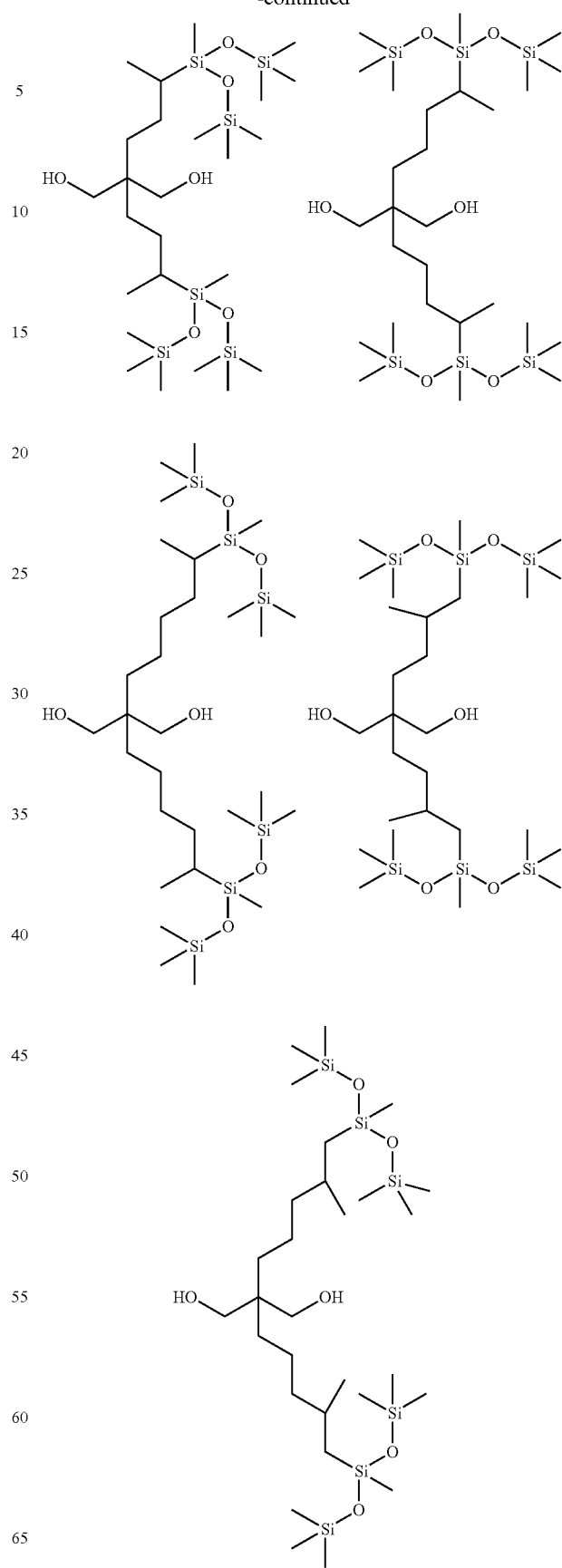

-continued

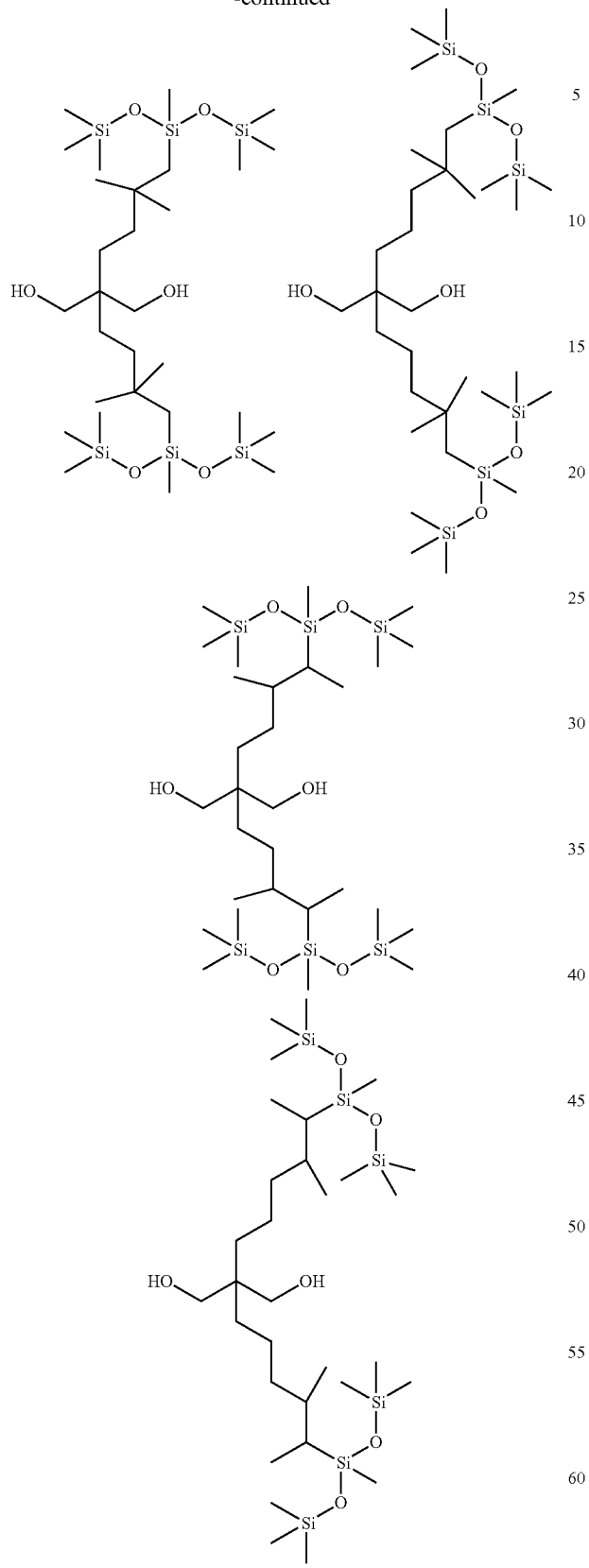

In general, silicone with shorter chain length forms a stretchable film in which the strength is less lowered. On the other hand, silicone with longer chain length brings more improved repellency. Silicone with a branched structure makes it possible to improve the repellency with shorter chain length. Accordingly, it is more preferable that the inventive silicon-containing compound be shown by the following formula (3).

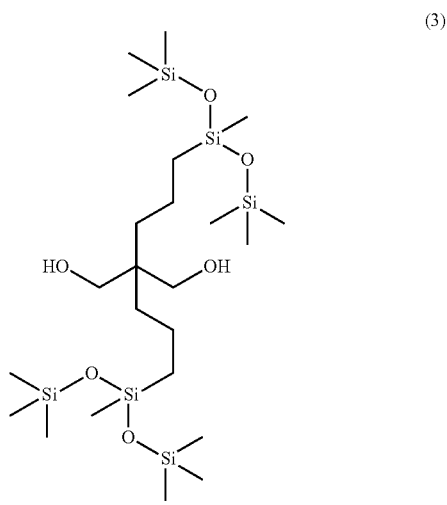

(3)

The inventive silicon-containing compound like this can be a material of a urethane resin used for a stretchable film, making it possible to form a stretchable film that has excellent stretchability and strength equal to those of polyurethane, with the film surface having excellent repellency equal to or superior to that of silicone in which the main chain is composed of a siloxane bond.

<Urethane Resin (Urethane Polymer)>

The inventive urethane resin has a structure shown by the following formula (4).

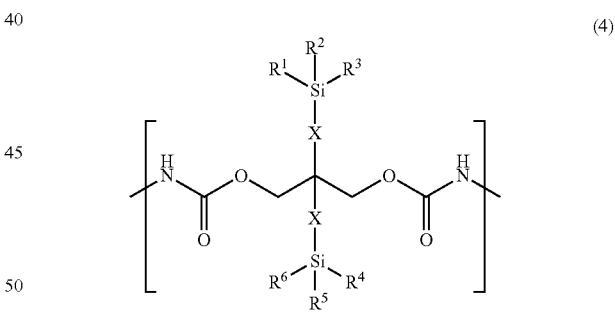

(4)

In the formula, $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by —(OSiR$^7$R$^8$)$_n$—OSiR$^9$R$^{10}$R$^{11}$; $R^7$, $R^8$, $R^9$, $R^{10}$, and $R^{11}$ have the same meanings as $R^1$ to $R^6$; "n" is an integer in the range of 0 to 100.

In the formula, X represents a linear or branched alkylene group having 3 to 7 carbon atoms optionally having an ether group.

Concrete examples of the inventive urethane resin is not particularly limited. As the side chain having a silicon-containing group, it is possible to apply the same ones illustrated in the concrete examples of the silicon-containing compound described above.

The urethane resin preferably comprises a hard segment composed of the moiety sandwiched between the two urethane bonds shown by the formula (4) and a soft segment composed of a moiety of polyether, polyester, and/or polycarbonate for extending the chain length.

The structure shown by the formula (4) attains improved strength by hydrogen bond. It is conceived that the structure shown by the formula (4) forms a crystallized structure. This will be described specifically in the following.

The inventive urethane resin has a structure characterized by a plurality of pendant groups each having a silicon atom in the side chain as shown in the formula (4). The existing of highly repellent silicon-containing groups push the highly hydrophilic urethane bonds to the opposite side to orient the localized electrons of the urethane bonds outward, thereby forming more strong hydrogen bonds. In case of introducing silicone into the main chain, the strength is lowered although the repellency is improved. In case of introducing silicon-containing groups into the side chain as in the present invention, however, not only the repellency but also the strength is improved by the reason described above. It is also possible to dramatically improve the repellency and the strength by introducing a plurality of silicon-containing groups in the side chains.

In general, a highly stretchable film is flexible, and such a flexible film with high stretchability cause to increase the self-adhesiveness as the film becomes thinner, thereby making the films tend to adhere with each other to be difficult to release. In case of stretchable films to be adhered to skins, a thinner stretchable film is required to decrease the deficiency in wear comfort when it is adhered. Introduction of silicon-containing groups allows the film surface to decrease the self-adhesiveness or tacky feel to be non-greasy. In such thin films that the self-adhesiveness increases, the film surface is allowed to decrease the greasy feeling by introducing a plurality of silicon-containing groups into side chains of the compound to be a material of the thin film. Since the film loses the strength as it becomes thinner, the silicon-containing groups are introduced into the side chain not into the main chain in the inventive urethane resin as described above to improve the strength.

The inventive urethane resin is preferably a urethane resin that contains a structure shown by the following formula (5) as the structure shown by the formula (4).

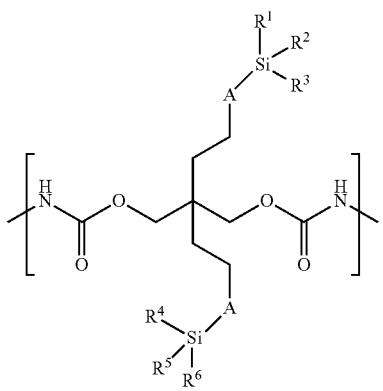

(5)

In the formula, $R^1$, $R^2$, $R^3$, $R^4$, $R^5$, and $R^6$ have the same meanings as defined above; and "A" represents a linear or branched alkylene group having 1 to 4 carbon atoms.

The inventive urethane resin more preferably has a structure that contains a (meth)acrylate group at the terminal shown by the following formula (6).

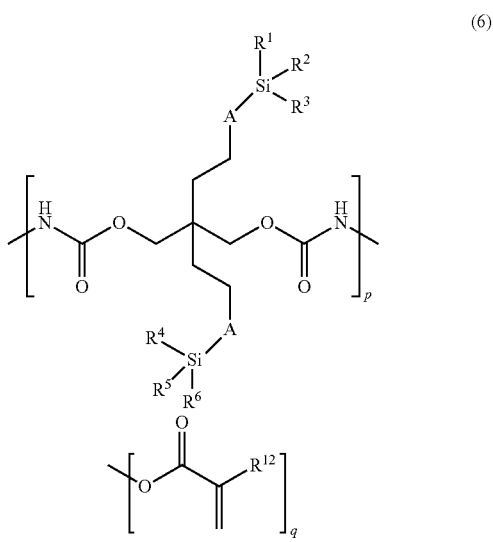

(6)

In the formula, $R^1$, $R^2$, $R^3$, $R^4$, $R^5$, $R^6$, and "A" have the same meanings as defined above; $R^{12}$ represents a hydrogen atom or a methyl group; "p" and "q" each represent a number of unit in one molecule, and are integers in the range of $1 \leq p \leq 100$ and $1 \leq q \leq 3$.

[Production Method of Urethane Resin]

The production method of the inventive urethane resin is not particularly limited, but it is preferably produced such that the inventive silicon-containing compound described above is used as a raw material, and this silicon-containing compound is allowed to react with a compound that contains isocyanate groups (an isocyanate compound).

The isocyanate compound used for the reaction with the inventive silicon-containing compound is not particularly limited, and the illustrative examples thereof include the following.

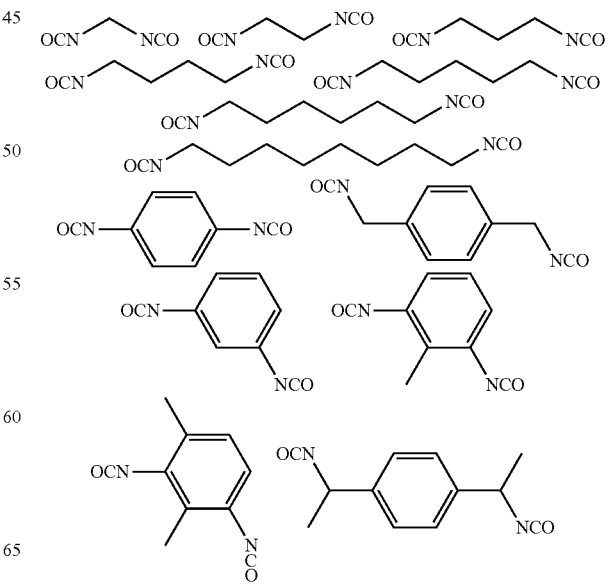

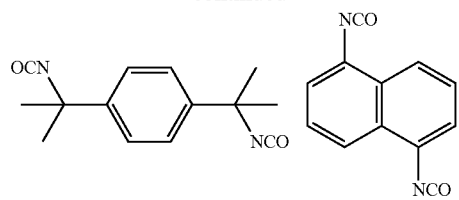
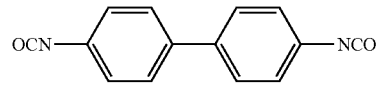
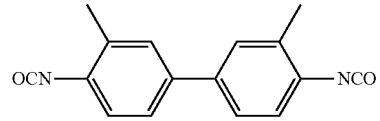
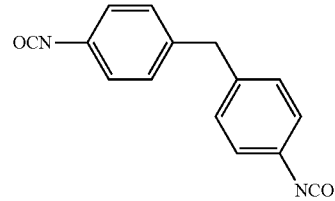
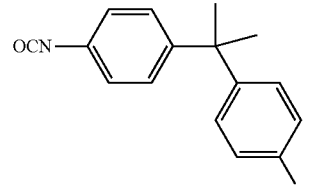
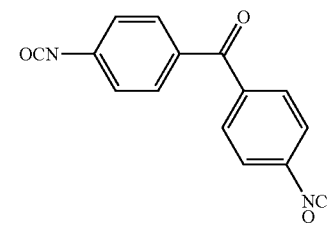
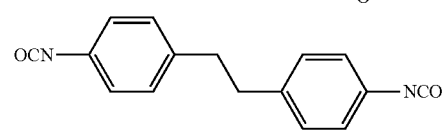
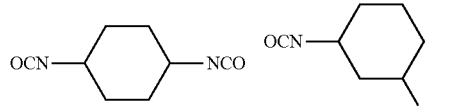
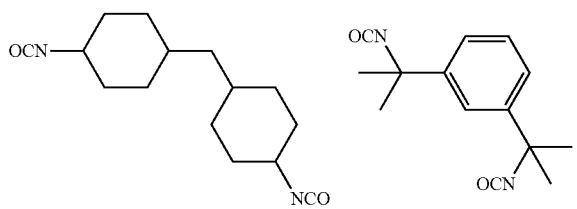
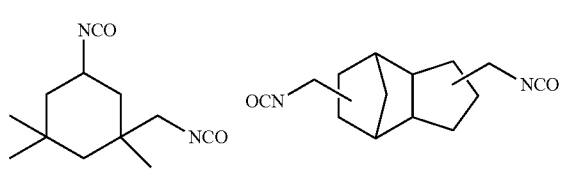
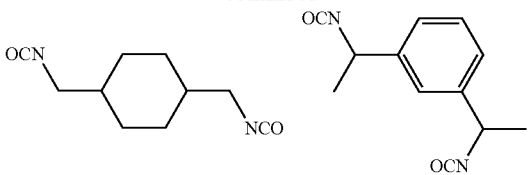
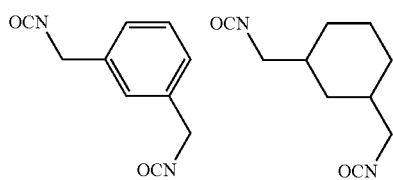
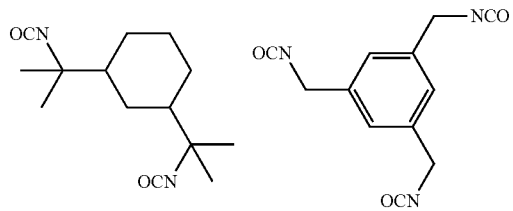
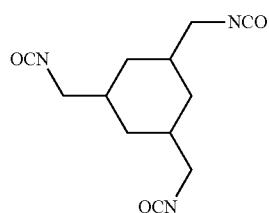
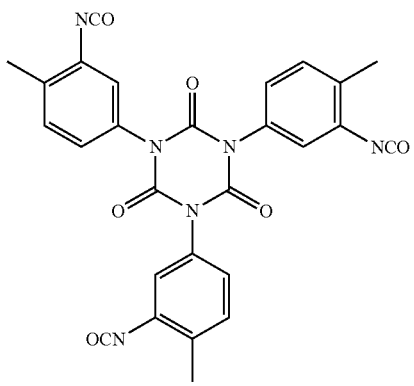
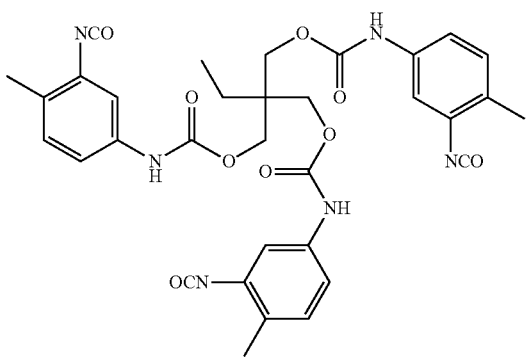

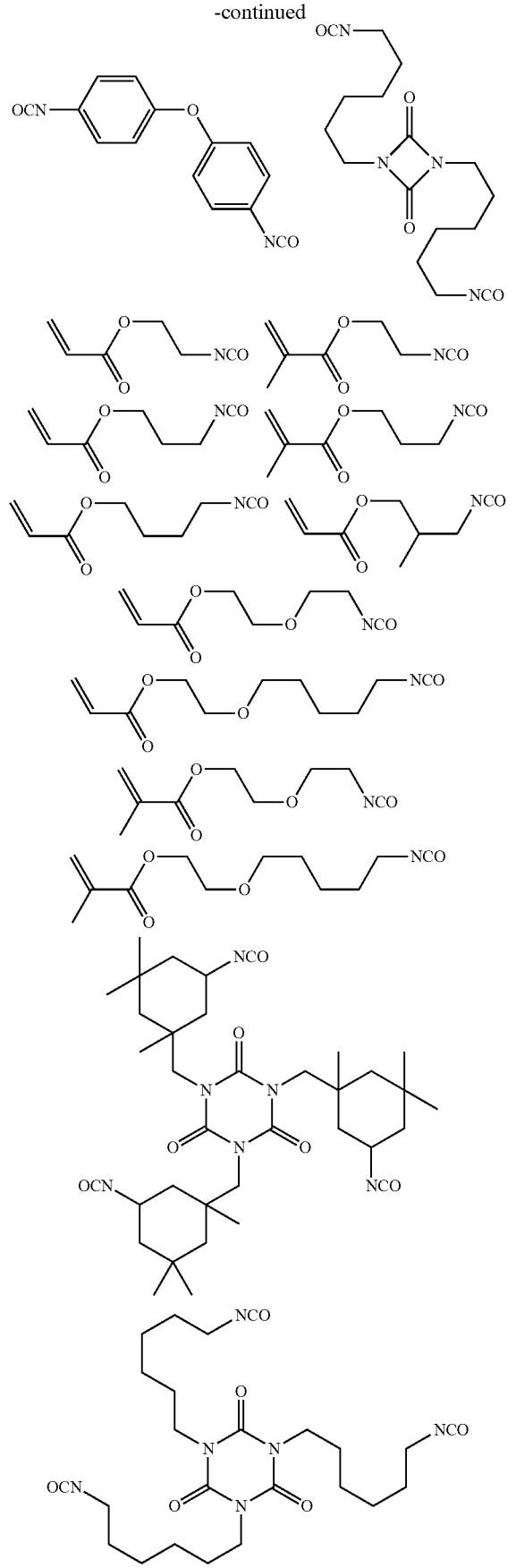
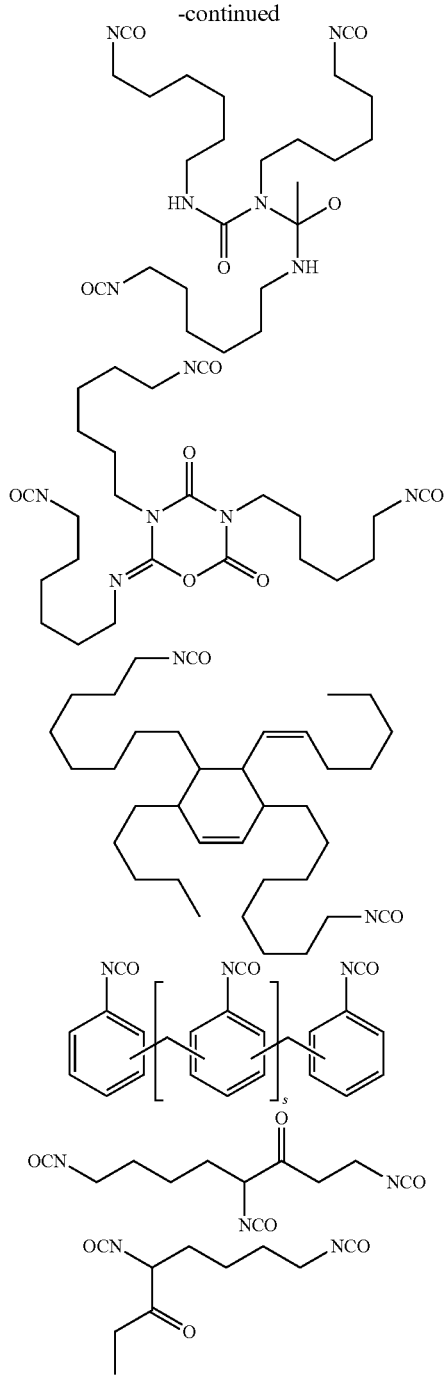

In the formulae, "s" is an integer of 1 or more.

Among the isocyanate compounds described above, the compound having a (meth)acrylate group particularly makes it possible to give the resin having the structure containing a (meth)acrylate group at the terminal shown by the formula (6) through the reaction with the inventive silicon-containing compound. It is also possible to obtain a polymer that has a structure containing a (meth)acrylate group at the terminal shown by the formula (6) by the reaction of the inventive silicon-containing compound and reaction product of a compound having a hydroxy group-containing (meth)acrylate group and an isocyanate compound.

As the isocyanate compound described above, it is preferable to use a compound having blocked isocyanate groups in which the isocyanate groups have been protected by substituents. This facilitates the control of the reaction even when the reactivity of the isocyanate compound and the silicon-containing compound shown by the formula (1) is high. The isocyanate compound can react with moisture in the air to inactivate the isocyanate groups during the storage, and have to be carefully stored such as sufficient moisture-proofing. These phenomena can be prevented by the compound having blocked isocyanate groups.

The blocked isocyanate group is a blocked group that is deprotected by heating to be an isocyanate group. Illustrative examples thereof include isocyanate groups substituted with alcohol, phenol, thioalcohol, imine, ketimine, amine, lactam, pyrazole, oxime, and β-diketone.

In the use of a compound that has blocked isocyanate groups, a catalyst may be added to decrease the temperature for deprotecting the blocked isocyanate groups. This catalyst is not particularly limited, and known examples thereof include organic tin compounds such as dibutyl tin dilaurate, bismuth salts, and zinc carboxylate such as zinc 2-ethyl-hexanoate and zinc acetate.

As the dissociation catalyst for a blocked isocyanate, it is preferable to use zinc α, β-unsaturated carboxylate as described in JP 2012-152725A.

When the inventive urethane resin is prepared, a compound having a plurality of hydroxy groups can be added in addition to the silicon-containing compound shown by the formula (1) and the isocyanate compound. Addition of the compound having a plurality of hydroxy groups like this makes it possible to extend the chain length or crosslink the molecules of the inventive urethane resin.

The compound having a plurality of hydroxy groups is not particularly limited, and the illustrative examples thereof include the following.

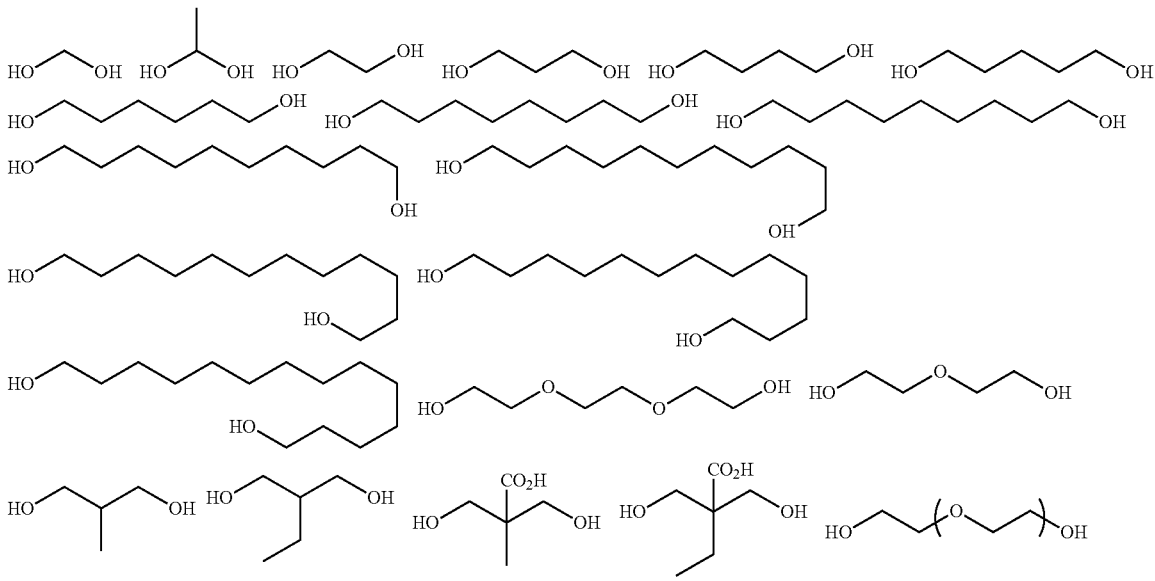

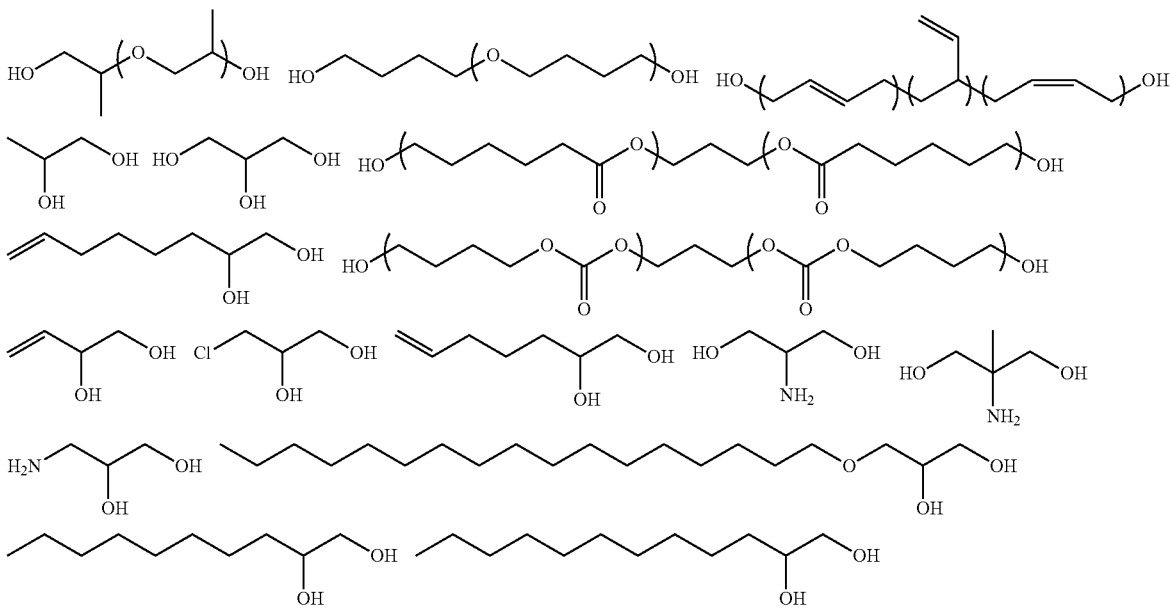

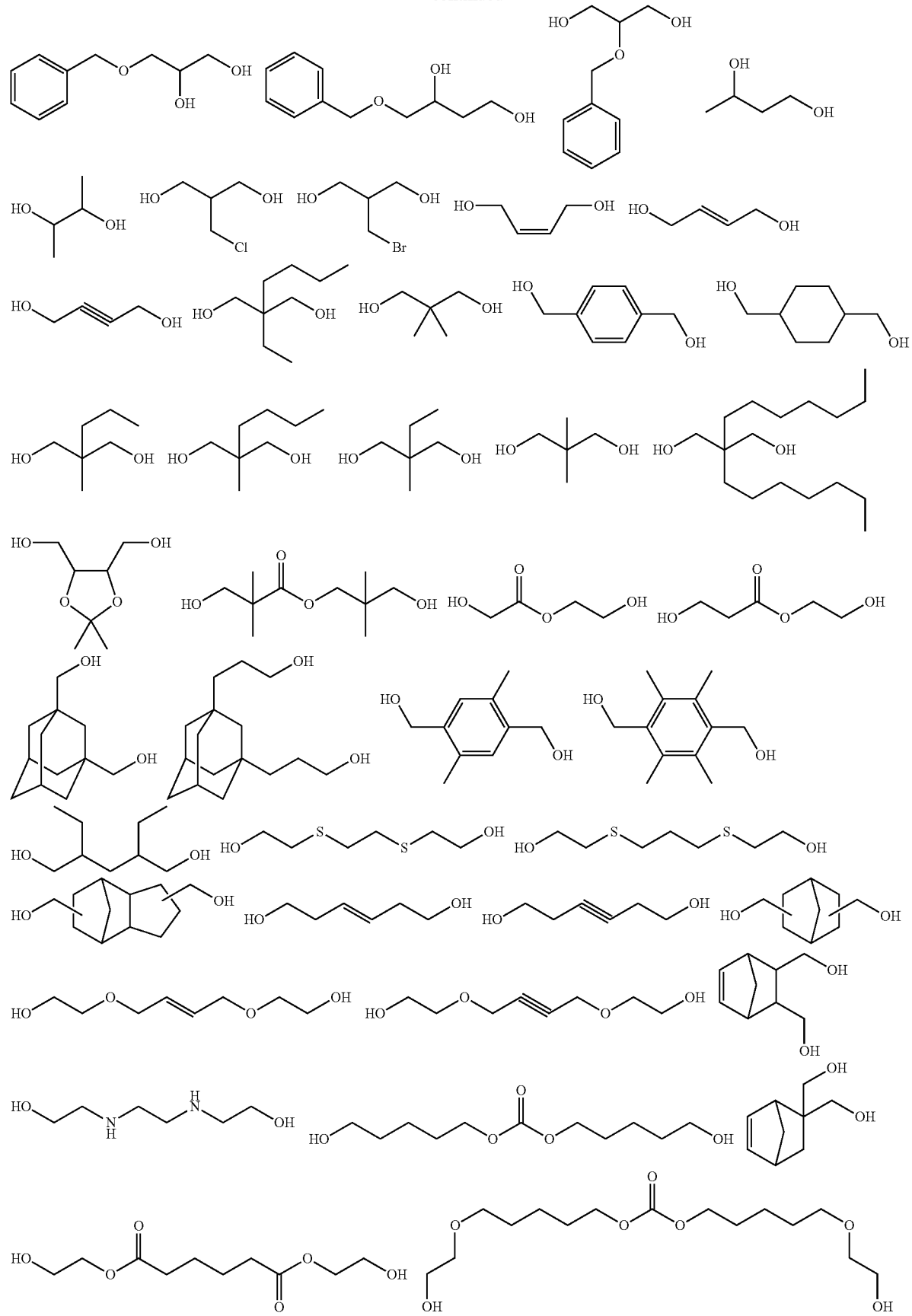

-continued
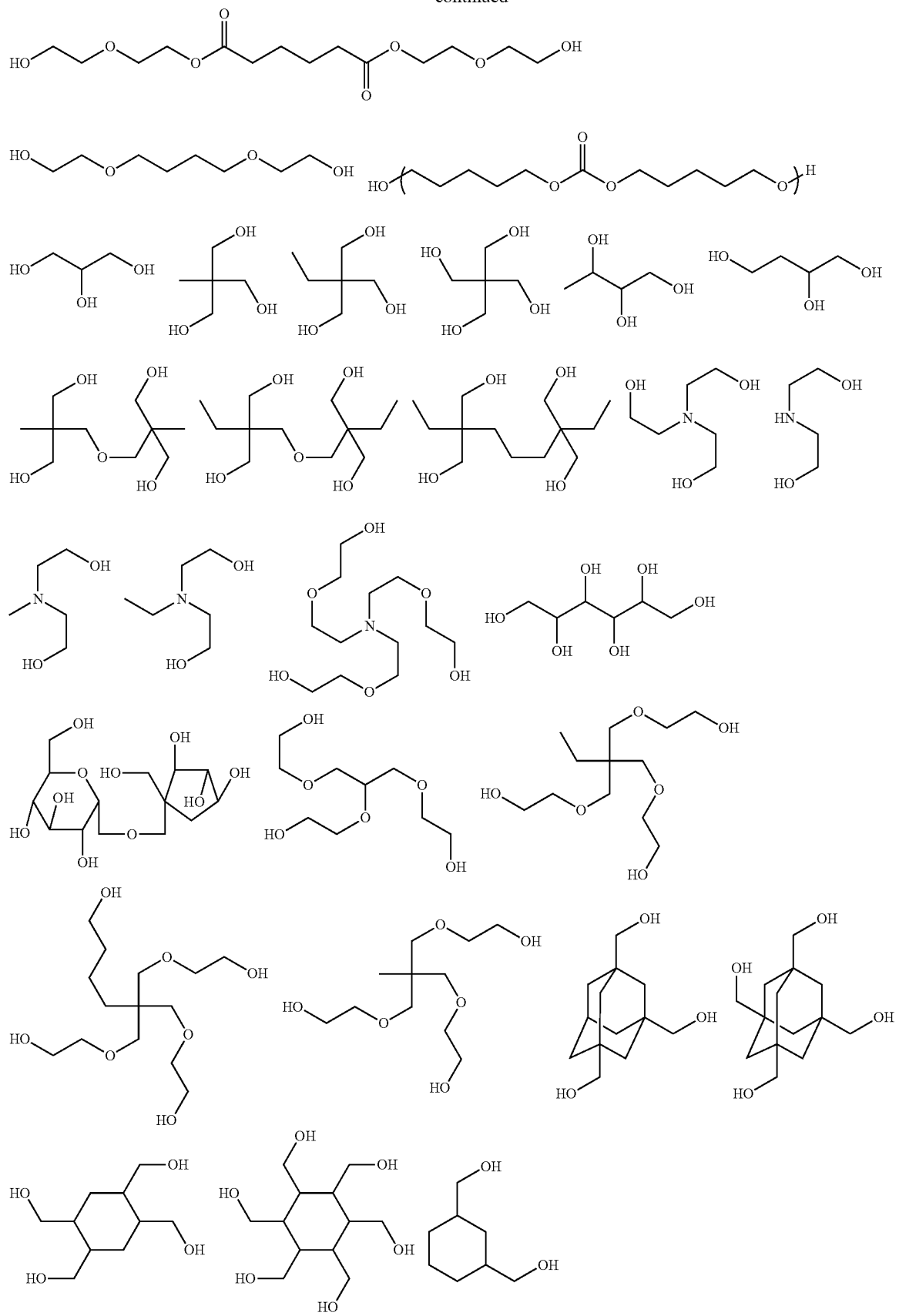

Additionally, a compound having an amino group can also be added. When an isocyanate group reacts with an amino group, a urea bona is formed. The moieties of a urethane bond and a urea bond is a hard segment, and improves the strength through their hydrogen bonds. The strength is successfully improved by the addition of urea bonds not only by urethane bonds.

Among the soft segments formed from a diol compound for extending the chain length containing polyether, polyester, or polycarbonate, most stretchable one is polyether, followed by polyester and polycarbonate, in which order the stretchability decreases. On the other hand, the order of tensile strength is in the opposite order to the order of stretchability. The strength and the stretchability can be controlled by selecting the kind of the soft segment or repeating unit.

The inventive urethane resin preferably has a weight average molecular weight of 500 or more. They can be favorably used for the inventive stretchable film. The upper limit of the weight average molecular weight of the resin is preferably 500,000 or less.

The inventive urethane resin having a structure with urethane bonds shown by the formula (4) can be used for forming fibers, not only for the use of forming a stretchable film that will be described later. The fiber material can be woven to form a stretchable fabric or formed to an unwoven fabric. The inventive urethane resin can also be used for coating polyester or cotton to give a fabric or non-woven fabric.

The urethane resin having urethane bonds shown by the formula (4) can be formed into a urethane gel. A highly repellent and highly elastic gel with low hardness can be formed by reducing the crosslinking density. The soft gel has comfortable touch and has repellent properties to repel perspiration or water.

<Stretchable Film>

The inventive stretchable film is a cured material of a composition containing the inventive urethane resin. As the urethane resin to be contained, the ones described above can be used.

The inventive stretchable film is preferably the one that exhibits a stretching property of 40 to 1000% in a tensile test regulated by JIS K 6251. With such a stretching property, the inventive stretchable film can be used particularly favorably for a coating film of stretchable wiring.

The inventive stretchable film is preferably used for a film to be in contact with a conductive wiring having stretchability. The inventive stretchable film can be favorably used for these uses.

The inventive stretchable film described above has excellent stretchability and strength equal to those of polyurethane, with the film surface having excellent repellency that is equal to or superior to that of silicone.

<Method for Forming Stretchable Film>

The present invention provides a method for forming a stretchable film, comprising:

mixing a compound shown by the following formula (1) and a compound having an isocyanate group to make a mixture, forming a film of the mixture; and curing the film by heating.

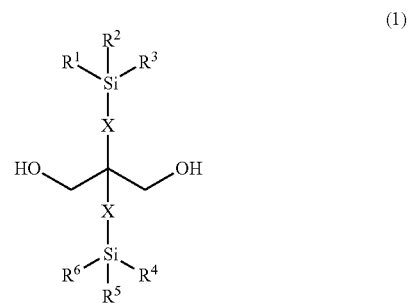

In the formula, $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by $—(OSiR^7R^8)_n—OSiR^9R^{10}R^{11}$; $R^7$, $R^8$, $R^9$, $R^{10}$, and $R^{11}$ have the same meanings as $R^1$ to $R^6$; "n" is an integer in the range of 0 to 100; and X represents a linear or branched alkylene group having 3 to 7 carbon atoms that may contain an ether group.

An example of such a method for forming a stretchable film includes a method of mixing a silicon-containing compound shown by the formula (1), a protected or unprotected isocyanate compound, together with a compound that contains a plurality of hydroxy groups for extending the chain length or crosslinking, a compound having an amino group, a catalyst, etc. In certain cases; applying this mixture onto a substrate for peeling to form a film; and heat curing to form a cured film.

As the silicon-containing compound used for this method for forming a stretchable film, the inventive silicon-containing compound described above can be used. As the compound having isocyanate groups, it is possible to use the same isocyanate compound as each of those described in the explanation of the urethane resin.

As the silicon-containing compound shown by the formula (1), it is preferable to use the one shown by the following formula (2):

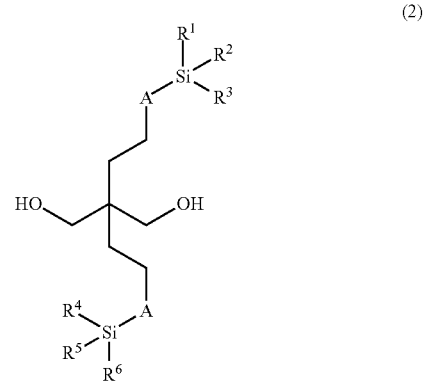

wherein $R^1$, $R^2$, $R^3$, $R^4$, $R^5$, and $R^6$ have the same meanings as defined above; and "A" represents a linear or branched alkylene group having 1 to 4 carbon atoms.

As the silicon-containing compound shown by the formula (1), it is preferable to use the one shown by the following formula (3).

(3)

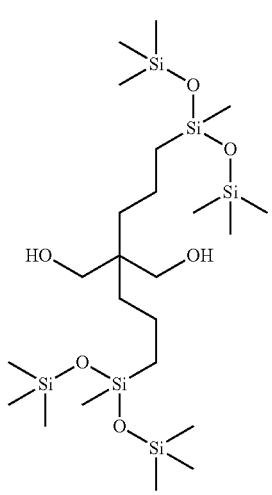

In this method, a polymer network is formed by increasing the molecular weight while forming urethane bonds through reaction of isocyanate and alcohol. In case of adding a compound that has three or more of hydroxy groups or isocyanate groups, crosslinking reaction proceeds to lower the stretchability, but improve the film strength. Accordingly, it is possible to control the hardness, the stretchability, and the strength by controlling the amount of the compound having two or three hydroxy groups or isocyanate groups. Additionally, an independent stretchable film can be obtained by peeling the film from the substrate for peeling after being cured.

Regarding the molar ratio of the hydroxy groups and isocyanate groups in the composition for forming a stretchable film, it is preferable that the hydroxy groups and isocyanate groups be in the same molar amount, or the molar number of hydroxy groups be larger, that is, the value of the molar number of hydroxy groups divided by the molar number of isocyanate groups be 1 or more. When the molar number of isocyanate groups is smaller, carbonic acid gas cannot be formed through the reaction of excess isocyanate groups with water, thereby allowing the film to prevent causing of voids due to foaming. In general, foamed urethane is produced with excess isocyanate groups. In the inventive method for forming a stretchable film, however, the stretchable film is required to have improved strength, and the film is preferably free from void due to foaming thereby.

When the resin in the inventive stretchable film is formed in condition that the molar number of hydroxy groups is larger than that of isocyanate groups as described above, the terminal of the polymer sometimes has a moiety in which a urethane bond is formed at one side of the silicon-containing compound shown by the formula (1) without forming a structure in which urethane bonds are formed at the both sides as in the structure shown by the formula (4). In this case, the terminal of the polymer has a structure shown by the following formula (4').

(4')

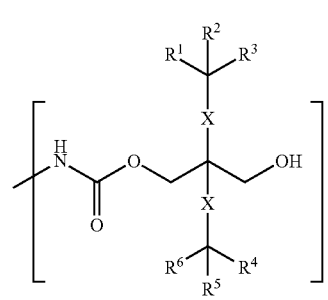

In the formula, $R^1$ to $R^6$ and X have the same meanings as defined above.

In the inventive method for forming a stretchable film, the heating temperature is generally set to in the range of room temperature to 200° C. for curing the composition formed to a film. Preferably, the temperature is set to in the range of 40 to 160° C. for the time of 5 seconds to 60 minutes. The heat curing is performed either by covering one side of the composition formed to a film with a peeling film or by covering the both sides of the composition formed to a film. It is preferable to cover one side in curing while being wound on a roll, and the both sides in batch curing, but the method is not limited thereto.

The present invention also provides a method for forming a stretchable film, comprising:

forming a film of a compound having a (meth)acrylate group at a terminal thereof shown by the following formula (6); and curing the film by heating and/or light irradiation.

(6)

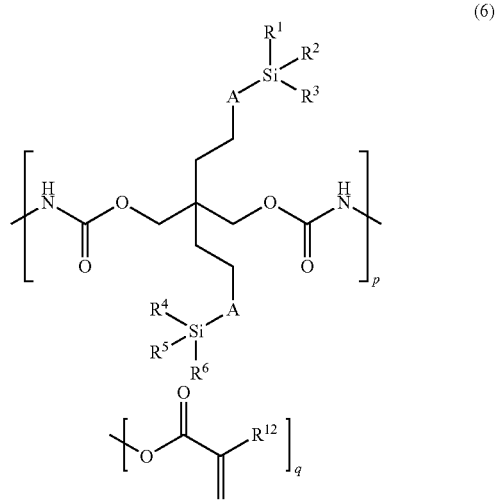

In the formula, $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by —(OSiR$^7$R$^8$)$_n$—OSiR$^9$R$^{10}$R$^{11}$; $R^7$, $R^8$, $R^9$, $R^{10}$, and $R^{11}$ have the same meanings as $R^1$ to $R^6$; "n" is an integer in the range of 0 to 100; "A" represents a linear or branched alkylene group having 1 to 4 carbon atoms; $R^{12}$ represents a hydrogen atom or a methyl group; "p" and "q" each represent a number of unit in one molecule, and are integers in the range of $1 \leq p \leq 100$ and $1 \leq q \leq 3$.

An example of such a method for forming a stretchable film includes a method in which urethane polymer is synthesized by reaction of isocyanate and alcohol, a (meth)acrylate group is formed at the terminal of this urethane polymer shown by the formula (6), and this polymer is formed to a film and cured by heating and/or light irradiation to form a stretchable film. Concretely, this is a method of mixing a silicon-containing compound shown by the formula (1), a protected or unprotected isocyanate compound, and a compound that contains a plurality of hydroxy groups for extending the chain length or crosslinking; followed by polymerization to form a stretchable film using urethane polymer having a polymer terminal of (meth)acrylate. In this case, (meth)acrylate is crosslinked by reaction of radical. As a method for radical crosslinking, addition of a radical generator is desirable. The radical generator includes a thermal-radical generator, which generates a radical by thermal decomposition, and a photo-radical generator, which generates a radical by light irradiation.

The thermal-radical generator is not particularly limited, and illustrative examples thereof include an azo radical generator and a peroxide radical generator. Illustrative examples of the azo radical generator include 2,2'-azobis(isobutyronitrile) (AIBN), 2,2'-azobis(2,4-dimethylvaleronitrile), dimethyl 2,2'-azobis(2-methylpropionate), 2,2'-azobis(4-methoxy-2,4-dimethylvaleronitrile), 2,2'-azobis(cyclohexane-1-carbonitrile), and 4,4'-azobis(4-cyanovaleric acid). Illustrative examples of the peroxide radical generator include benzoyl peroxide, decanoyl peroxide, lauroyl peroxide, succinic acid peroxide, t-butyl peroxy-2-ethylhexanoate, t-butyl peroxy pivalate, and 1,1,3,3-tetramethylbutyl peroxy-2-ethylhexanoate.

The photo-radical generator is not particularly limited, and illustrative examples thereof include acetophenone, 4,4'-dimethoxybenzyl, benzyl, benzoin, benzophenone, 2-benzoylbenzoic acid, 4,4'-bis(dimethylamino)benzophenone, 4,4'-bis(diethylamino)benzophenone, benzoin methyl ether, benzoin ethyl ether, benzoin isopropyl ether, benzoin butyl ether, benzoin isobutyl ether, 4-benzoylbenzoic acid, 2,2'-bis(2-chlorophenyl)-4,4',5,5'-tetraphenyl-1,2'-biimidazole, methyl 2-benzoylbenzoic acid, 2-(1,3-benzodioxole-5-yl)-4,6-bis(trichloromethyl)-1,3,5-triazine, 2-benzyl-2-(dimethylamino)-4'-morpholinobutylophenone, 4,4'-dichlorobenzophenone, 2,2-diethoxyacetophenone, 2,2-dimethoxy-2-phenylacetophenone, 2,4-diethylthioxanthen-9-one, diphenyl(2,4,6-trimethylbenzoyl)phosphine oxide, 1,4-dibenzoylbenzene, 2-ethylanthraquinone, 1-hydroxycyclohexyl phenyl ketone, 2-hydroxy-2-methylpropiophenone, 2-hydroxy-4'-(2-hydroxyethoxy)-2-methylpropiophenone, 2-isonitrosopropiophenone, 2-phenyl-2-(p-toluenesulfonyloxy)acetophenone (BAPO), and camphorquinone.

The loading amount of the thermal-radical generator or the photo-radical generator is preferably in the range of 0.1 to 50 parts by mass based on 100 parts by mass of the resin.

It is also possible to add a crosslinking agent that has a plurality of (meth)acrylate or thiol. This makes it possible to improve the efficiency of radical crosslinking.

It is also possible to add a monomer that has an alkyl group or an aryl group, or a monomer that has a silicon-containing group or a fluorine-substituted alkyl group or aryl group. This makes it possible to decrease the viscosity of the solution to form a stretchable film with thinner thickness. When these monomers each have a polymerizable double bond, they can be fixed into the film in curing the film.

The monomer that has an alkyl group or an aryl group is not particularly limited, and illustrative examples thereof include isobornyl acrylate, lauryl acrylate, tetradecyl acrylate, stearyl acrylate, isostearyl acrylate, behenyl acrylate, adamantane acrylate, phenoxyethyleneglycol acrylate, and phenoxydiethyleneglycol acrylate.

When a stretchable film is formed using a compound that has a (meth)acrylate group at the terminal, the curing can be performed by combining heat-curing and photo-curing. For example, it is possible to form a stretchable film as a base by heat-curing previously, and to form a stretchable film thereon by photo-curing. The photo-curing has merits of inessentiality of heating and capability of short period curing. The area where light does not reach may be cured by heat-curing. When heat-curing and photo-curing are combined, it is possible to select a method for caring in which each merit is applied.

The stretchable film is formed by the method of applying a composition onto a planer substrate or a roll. The method for applying the composition is not particularly limited, and illustrative examples thereof include spin coating, bar coating, roll coating, flow coating, dip coating, spray coating, and doctor coating. The coating is preferably performed so as to have a coating film thickness of 1 μm to 2 mm.

For encapsulating a part with unevenness, it is preferable to use a method such as roll coating and spray coating, or a method for coating a part that requires to be coated by screen printing, etc. In order to perform various coating or printing, the viscosity of the mixed solution have to be controlled. When lower viscosity is required, organic solvent may be added; when higher viscosity is required, filler such as silica is mixed.

The organic solvent is preferably an organic solvent with the boiling point being in the range of 115 to 200° C. at atmospheric pressure. It is preferable to use one or more organic solvents selected from 2-octanone, 2-nonanone, 2-heptanone, 3-heptanone, 4-heptanone, 2-hexanone, 3-hexanone, diisobutyl ketone, methylcyclohexanone, acetophenone, methylacetophenone, propyl acetate, butyl acetate, isobutyl acetate, amyl acetate, butenyl acetate, isoamyl acetate, phenyl acetate, propyl formate, butyl formate, isobutyl formate, amyl formate, isoamyl formate, methyl valerate, methyl pentenoate, methyl crotonate, ethyl crotonate, propylene glycol monomethyl ether, ethylene glycol monomethyl ether, propylene glycol monoethyl ether, ethylene glycol monoethyl ether, propylene glycol dimethyl ether, diethylene glycol dimethyl ether, propylene glycol monomethyl ether acetate, and propylene glycol monoethyl ether acetate.

In case of curing of the compound that has a (meth)acrylate group at the terminal shown by the formula (6) by heating, the heat, curing can be performed with a hot plate, in an oven, or by irradiation of far infrared ray, for example. The heating condition is preferably at 30 to 150° C. for 10 seconds to 60 minutes, more preferably 50 to 120° C. for 30 seconds to 20 minutes. The baking may be performed in any environment such as in the atmosphere, in an inert gas, or in vacuum.

In case of curing of the compound that has a (meth)acrylate group at the terminal shown by the formula (6) by light irradiation, the light irradiation is preferably performed with a light having a wavelength of 200 to 500 nm. As the light source, which is not particularly limited, a halogen lamp, a xenon lamp, excimer laser, and LED can be used, for example. Irradiation with electron beam is also preferable. The irradiation quantity is preferably in the range of 1 mJ/cm$^2$ to 100 J/cm$^2$.

Figure 2:
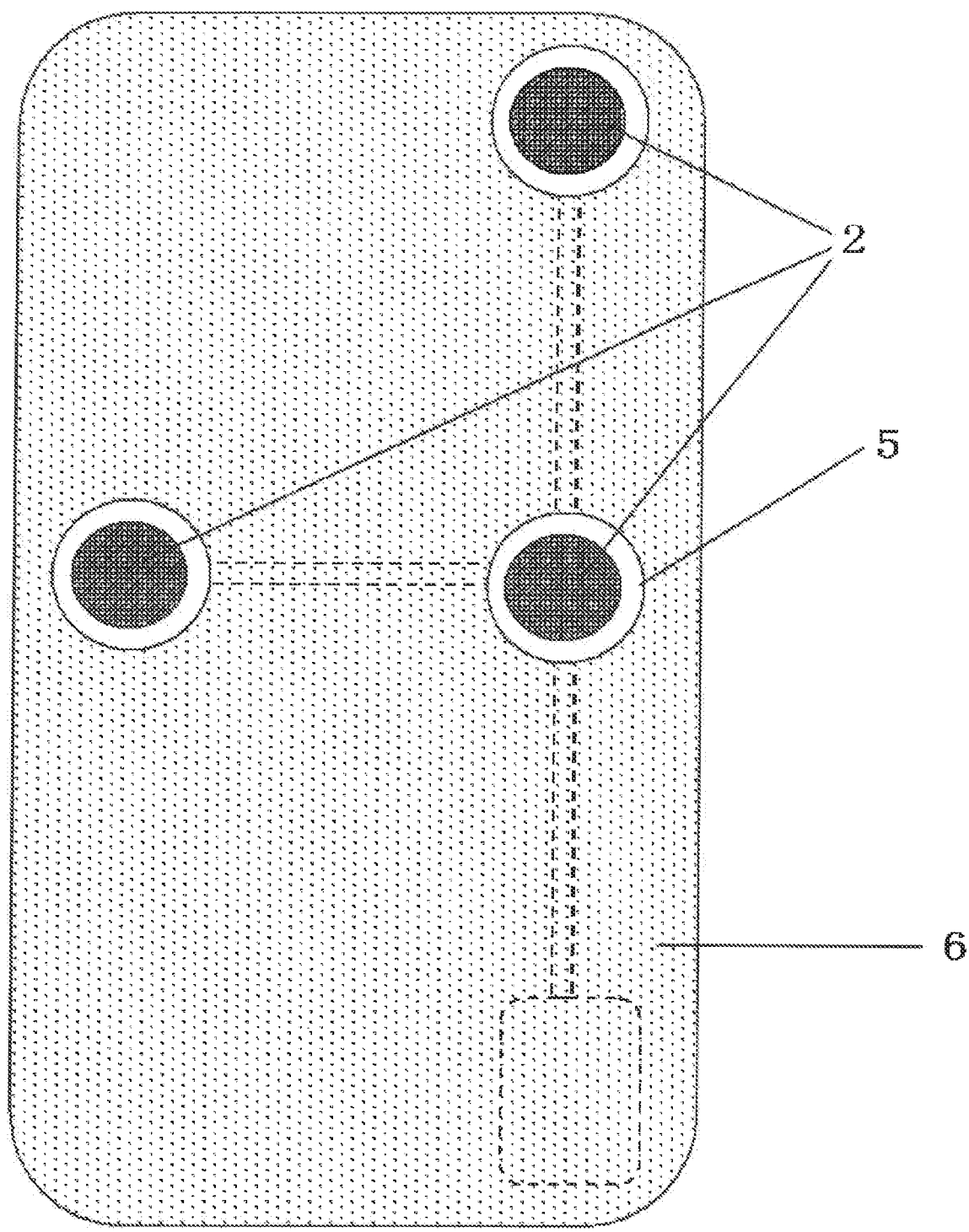
FIG. 2 is a schematic drawing of the electrocardiograph in FIG. 1 viewed from the bio-electrode.
Figure 3:
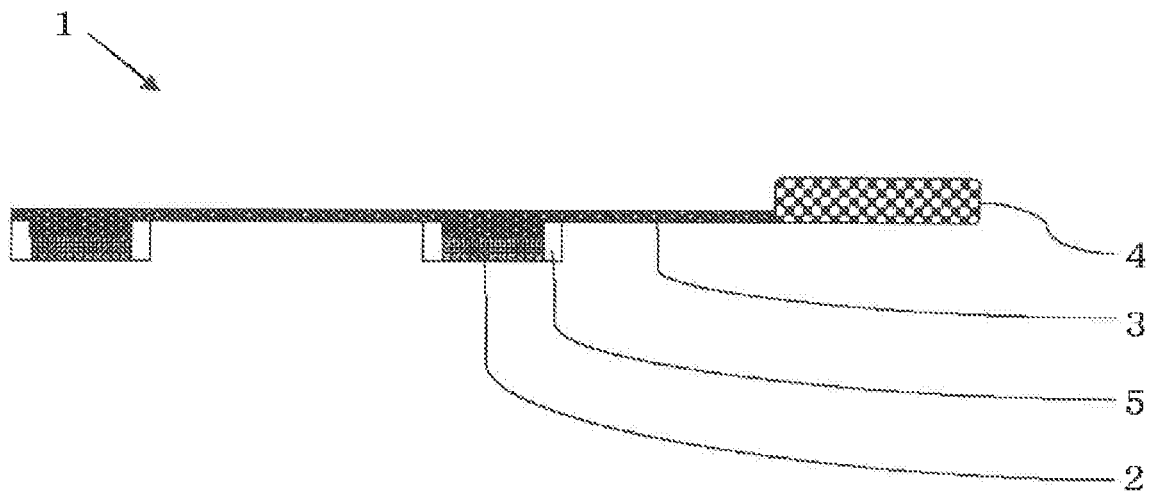
FIG. 3 is a sectional view showing a conventional electrocardiograph.
Figure 4:
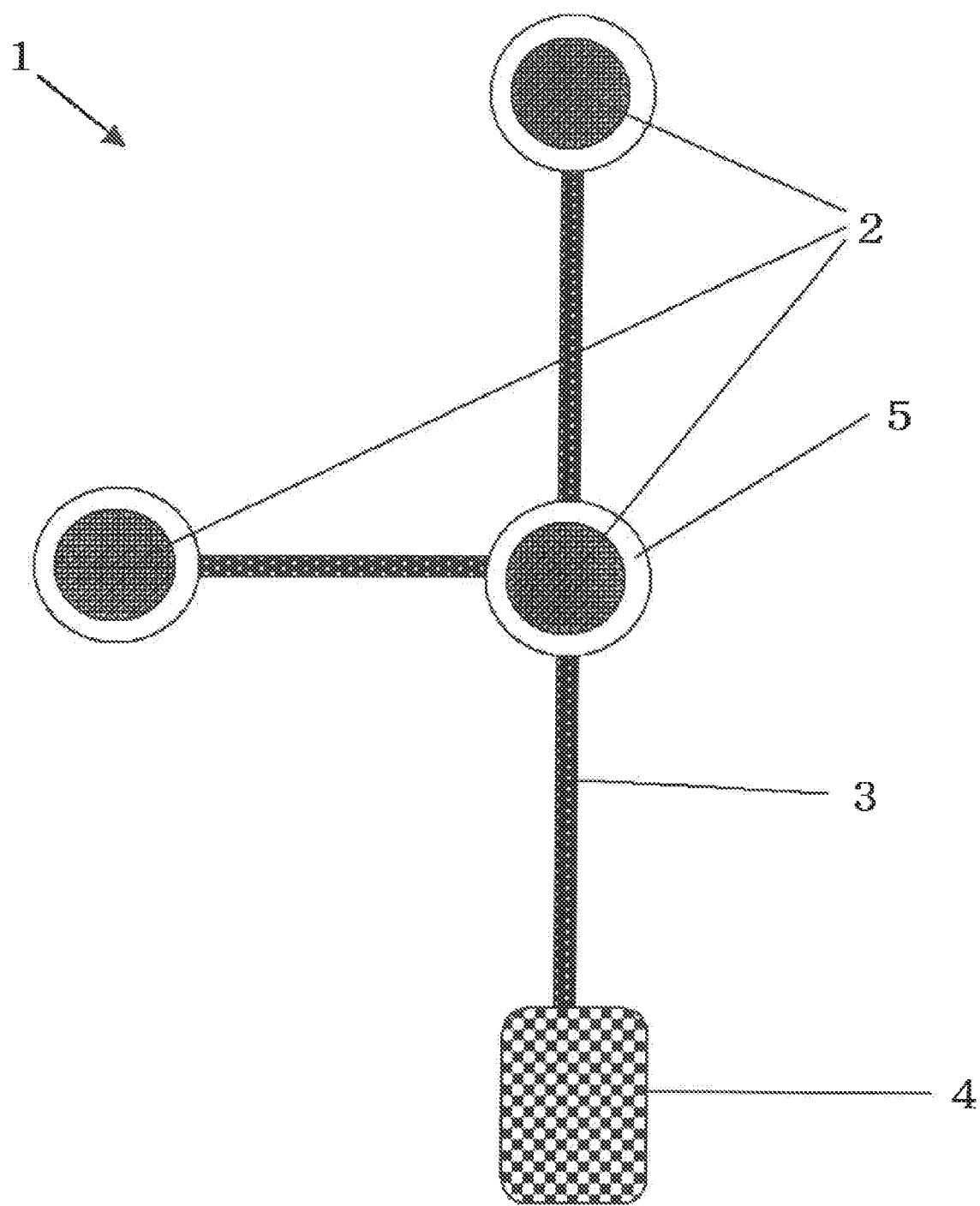
FIG. 4 is a schematic drawing of the electrocardiograph in FIG. 3 viewed from the bio-electrode.

An example of using the inventive stretchable film is shown in FIGS. 1 and 2. FIG. 1 is a sectional view showing an electrocardiograph in a state being coated with the inventive stretchable film, and FIG. 2 is a schematic drawing of the electrocardiograph in FIG. 1 viewed from the bio-electrode. FIG. 3 is a sectional view showing an electrocardiograph 1 in a state before being coated with the inventive stretchable film, FIG. 4 is a schematic drawing of the electrocardiograph 1 in FIG. 3 viewed from the bio-electrode, and the electrocardiograph 1 in FIGS. 3 and 4 is the one described in Patent Literature 1. As shown in FIGS. 3 and 4, the electrocardiograph 1 is linked with wiring 3 through which three bio-electrodes 2 conduct electric signals and is connected to a center device 4.

As the material of the wiring 3, electrically conductive material are generally used, including metal such as gold, silver, platinum, titanium, and stainless as well as carbon. The wiring can be a bellows form as described, in Patent Literature 1 to provide stretchability, and can be formed by pasting powder of the electrically conductive material or wire of the electrically conductive material on a stretchable film, printing electrically conductive ink that contains the electrically conductive material on a stretchable film, or using an electrically conductive fabric in which the electrically conductive material and fibers are combined.

The electrocardiograph 1 have to be adhered to skin. Accordingly, in the electrocardiograph 1 in FIGS. 1 to 4, a self-adhesive part 5 is disposed around the bio-electrode 2 in order not to separate the bio-electrode 2 from skin. Incidentally, when the bio-electrode 2 has self-adhesiveness, the surrounding self-adhesive part 5 is inessential.

This electrocardiograph 1 is coated with a stretchable film 6, which is the inventive stretchable film, as shown in FIG. 1. However, the bio-electrode 2 and the self-adhesive part 5 are not coated with the stretchable film 6 as shown in FIG. 2 since they have to be adhered to skin.

When the electrocardiograph 1 is coated with the stretchable film 6, it is possible to coat the back and front sides of the electrocardiograph 1 simultaneously, or coat each side one by one. When the bio-electrode 2 and the self-adhesive part 5, which will be in contact with skin, are left uncoated, the electrocardiograph 1 coated with the stretchable film 6 as shown in FIG. 1 can be obtained such that the electrocardiograph 1 is placed on a substrate 7 with releasability so as to be in contact with the self-adhesive part 5 and is coated with a stretchable film material as shown in FIG. 5, for example, and this is cured by light or heat to form the stretchable film 6, followed by being delaminated from the substrate 7.

Figure 6:
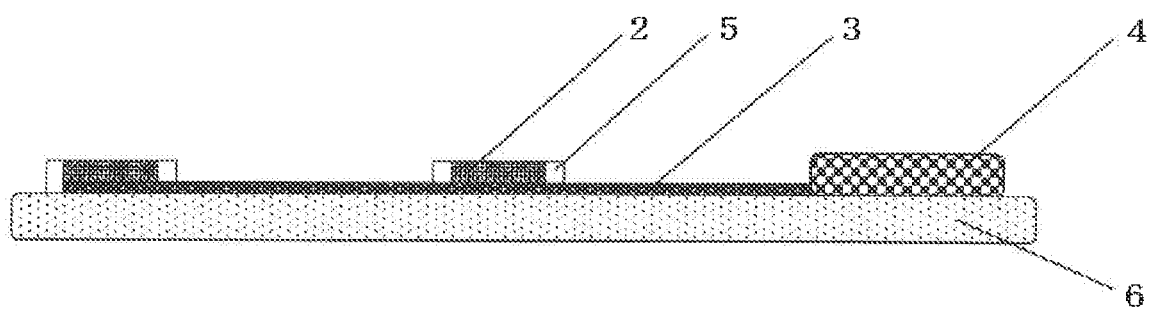
FIG. 6 is a sectional view showing the inventive stretchable film on which a bio-electrode, a self-adhesive part, and wiring are formed, and a center device is connected.
Figure 7:
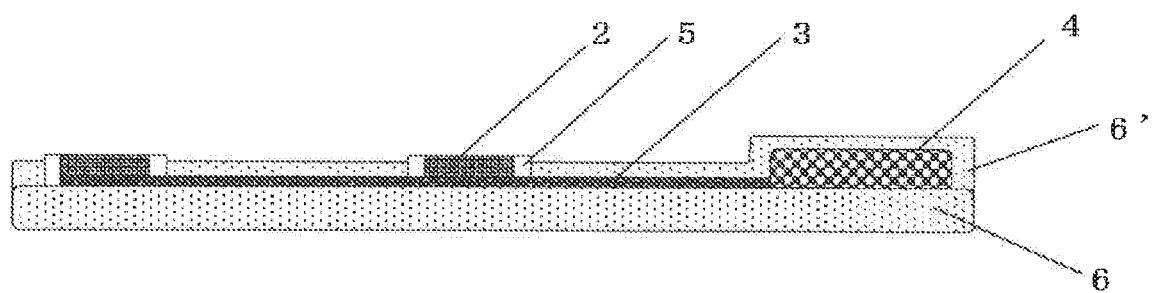
FIG. 7 is a sectional view showing the wiring and the center device in FIG. 6 in a state being coated with the inventive stretchable film.

Alternatively, illustrative examples thereof include a method in which the bio-electrode 2, the adhesive part 5, and the wiring 3 are formed on the stretchable film 6 to connect the center device 4 as shown in FIG. 6, and then stretchable film material is applied thereon and is cured as shown in FIG. 7 to form a stretchable film 6'. In this case, the bio-electrode 2, the adhesive part 5, and the wiring 3 may be formed on the stretchable film 6 that has been formed on the releasable substrate 7.

Figure 8:
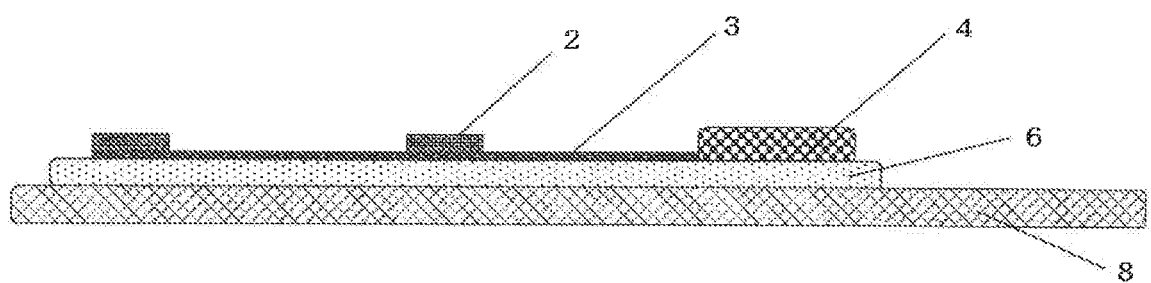
FIG. 8 is a sectional view showing the inventive stretchable film, formed on a fabric, on which wiring and an electrode are formed, and at center device is connected.
Figure 9:
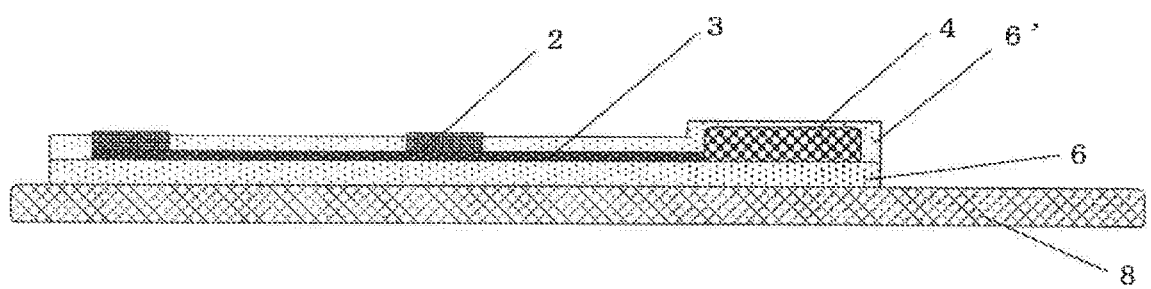
FIG. 9 is a sectional view showing the wiring and the center device in FIG. 8 in a state being coated with the inventive stretchable film.

Additionally, it is also possible to form the stretchable film 6 on a fabric 8, followed by forming the bio-electrode 2 and the wiring 3 thereon to connect the center device 4 as shown in FIG. 8, and to form the stretchable film 6' thereon to coat the wiring 3 and the center device 4 as shown in FIG. 9.

Figure 5:
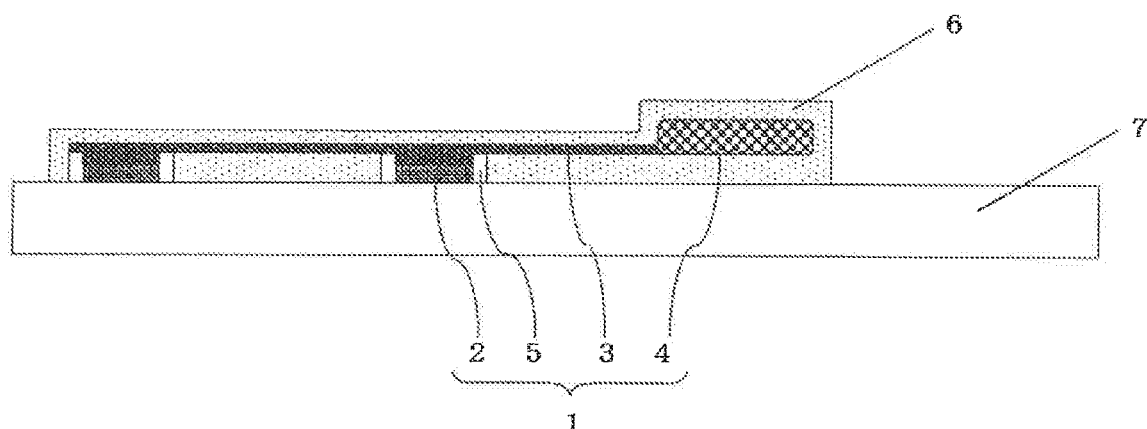
FIG. 5 is a sectional view showing an electrocardiograph in a state being in contact with a substrate and coated with the inventive stretchable film.

Incidentally, when the stretchable film 6 or 6' is formed on parts having unevenness as shown in FIGS. 5, 7, and 9, the above described methods are preferable such as roll coating, spray coating, and a method to coat a part that is required to be coated by screen printing, etc.

Alternatively, when the stretchable film 6' is formed on the stretchable film 6 as shown in FIGS. 7 and 9, the use of a compound shown by the formula (3) makes it possible to form the stretchable film 6 previously by heat curing, and to form the stretchable film 6' thereon by photo-curing.

The inventive method for forming a stretchable film described above makes it possible to easily form a stretchable film that has excellent stretchability and strength equal to or superior to those of polyurethane, with the film surface having high repellency.

EXAMPLES

Hereinafter, the present invention will be specifically described with reference to Examples and Comparative Examples, but the present invention is not limited thereto. Incidentally, the weight average molecular weight (Mw) represents a weight average molecular weight in terms of polystyrene determined by gel permeation chromatography (GPC).

Synthesis Example 1

(Synthesis of Propanediol (1-II))

The reaction shown in the following formula (7) was performed. Into a 2 L two-neck flask, 480 mL of tetrahydrofuran (THF) and 17.4 g of lithium aluminum hydride (LAH) were introduced, followed by stirring at room temperature in a nitrogen atmosphere. After being dissolved, the solution was cooled with ice bath. Subsequently, 49.6 g of diethyl diallylmalonate (1-I) and 275 mL of THF were introduced into a 500 mL two-neck flask. Then, this was added dropwise to the lithium aluminum hydride solution over 1 hour using a cannula. After finishing dropwise addition, the ice bath was removed, followed by stirring at room temperature for 1 hour. After confirming the disappearance of the raw materials by TLC, this was diluted with 200 mL of THF, and the reaction was terminated by adding 17.4 mL of water in an ice bath. Then, 17.4 mL of 15 mass % aqueous sodium hydroxide solution and 52.2 mL of water were added thereto, and this was stirred at room temperature. The obtained white suspension was filtered through celite, followed by reducing under reduced pressure to give 31.9 g of Propanediol (1-II) (yield: 99%) having the following characteristics.

Propanediol (1-II)

Colorless Liquid $^1$H-NMR (500 MHz, CDCl$_3$): δ=5.84 (2H, m), 5.11 (2H, m), 5.09 (2H, m), 3.58 (4H, s), 2.32 (2H, brs), and 2.07 (4H, d)

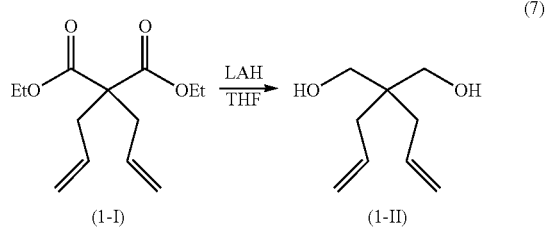 [SMILES: C=CCC(CC=C)(C(=O)OCC)C(=O)OCC ; C=CCC(CO)(CO)CC=C ; "THF"]

(7)

(Synthesis of Silicon-Containing Compound-1)

The reaction shown by the following formula (8) was performed. Into a 200 ml four-neck flask, 16.3 g of Propanediol (1-II) and 0.06 g of PL-50N (platinum catalyst solution, manufactured by Shin-Etsu Chemical Co., Ltd.) were introduced, and the temperature was increased to 55° C. using an oil bath in a nitrogen atmosphere. Then, 44.5 g of heptamethyltrisiloxane was added dropwise over 2.5 hours using a 100 mL dropping funnel. This was stirred for 3 hours after finishing the dropping addition, and then the temperature was returned to room temperature by removing the oil bath. The obtained brown solution was subjected to vacuum distillation to give 45.3 g of Silicon-containing compound-1 (1-III) (yield: 75%) having the following characteristics.

Silicon-Containing Compound-1 (1-III)

Colorless Liquid $^1$H-NMR (500 MHz, Acetone-d6): δ=0.02 (6H, m), 0.11 (36H, m), 0.46 (4H, m), 1.30 (8H, s), 3.45 (2H, dd), 3.46 (2H, s), and 3.57 (2H, dd)

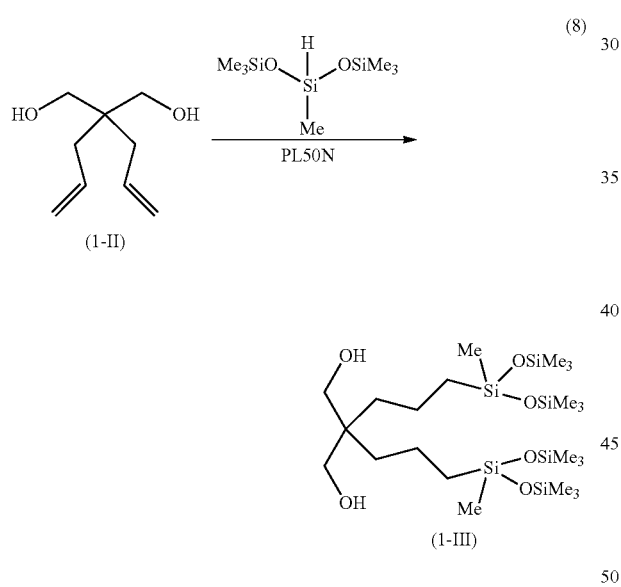

(8)

Synthesis Examples 2 to 5

(Synthesis of Silicon-Containing Compounds-2 to 4, Comparative Silicone-Pendant Diol Compound-1)

Silicon-containing compounds-2 to 4 and Comparative silicone-pendant diol compound-1 were synthesized by the same reaction as in Synthesis Example 1 except for using other siloxanes.

The following are Silicon-containing compounds-1 to 4, Comparative silicone-pendant diol compound-1, Isocyanate compounds-1 to 5, and Hydroxy compounds-1 to 8 blended to compositions for forming a stretchable film.

Silicon-containing compound-1

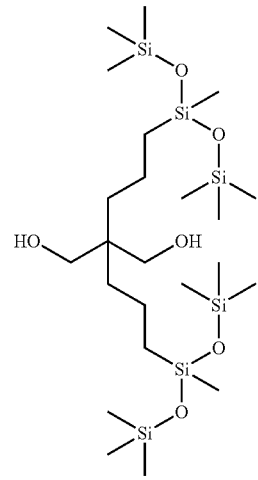

Silicon-containing compound-2

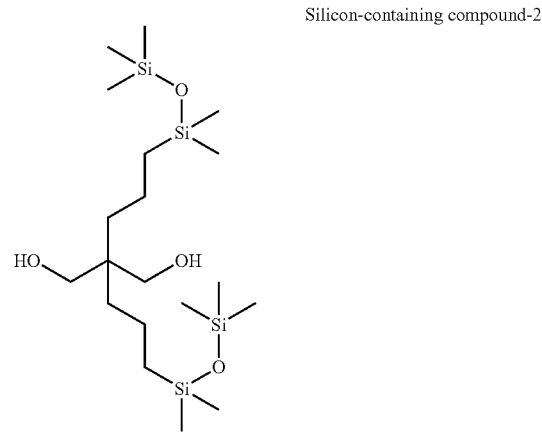

Silicon-containing compound-3

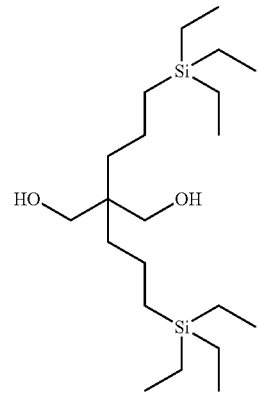

Silicon-containing compound-4

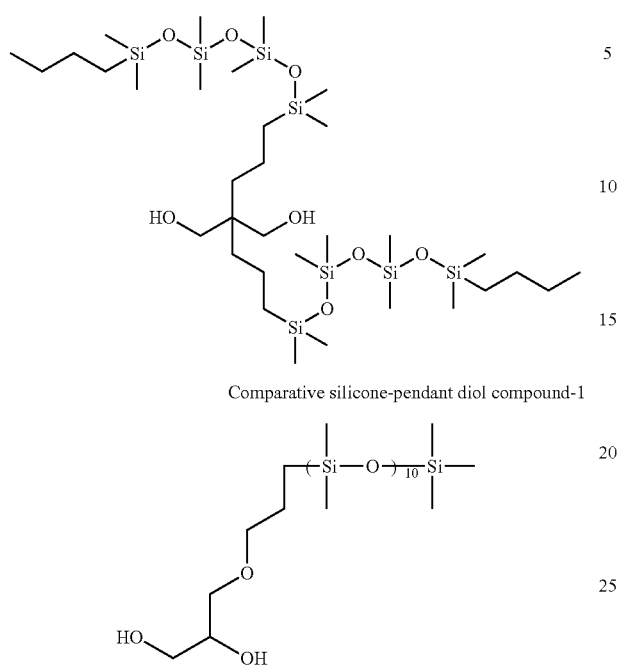

Comparative silicone-pendant diol compound-1

(In the formulae, the number of repeating units each represent the average value.)

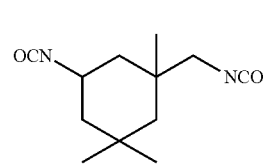 Isocyanate compound-1

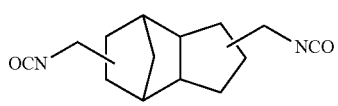 Isocyanate compound-2

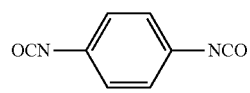 Isocyanate compound-3

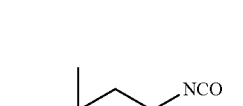 Isocyanate compound-4

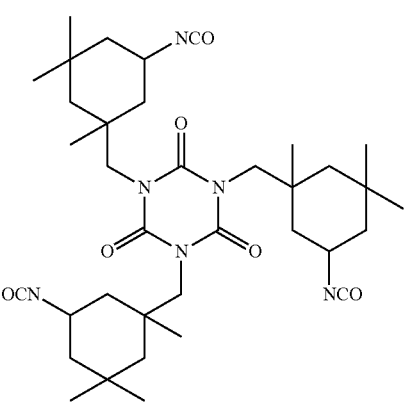

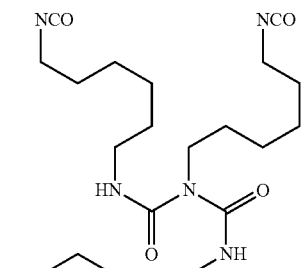 Isocyanate compound-5

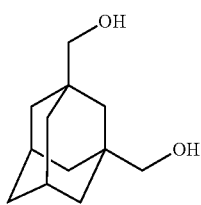 Hydroxy compound-1

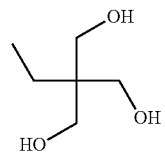 Hydroxy compound-2

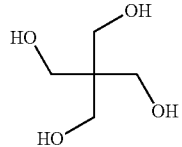 Hydroxy compound-3

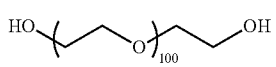 Hydroxy compound-4

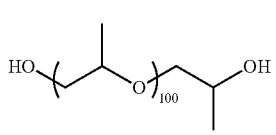 Hydroxy compound-5

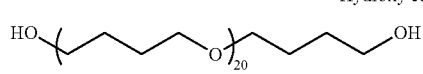 Hydroxy compound-6

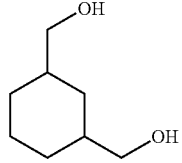 Hydroxy compound-7

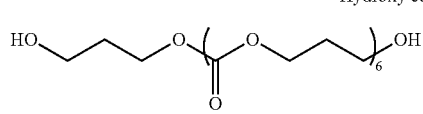 Hydroxy compound-8

(In the formulae, the number of repeating units each represent the average value.)

Synthesis Example 6

(Synthesis of Silicone-Pendant Urethane-(Meth)Acrylate-1 to 7, Comparative Urethane-(Meth)Acrylate-1)

Silicone-pendant urethane-(meth)acrylate blended as a compound having a (meth)acrylate group at the terminal was synthesized as described below.

1 mole of Hydroxy compound-1, 1 mole of Hydroxy compound-8 and 1 mole of Silicon-containing compound-1 were mixed, and contained water was removed by drying under reduced pressure with heating at 60° C. 4 moles of isophorone diisocyanate were added thereto, and then 0.001 mole of dibutyltin dilaurate was added, and the reaction was performed at 60° C. for 3 hours with stirring. Then, 2 moles of hydroxyethylacrylate were added thereto, and the reaction was performed at 60° C. for 3 hours with stirring to give Silicone-pendant urethane-(meth)acrylate-1 as a polymer. The obtained polymer was measured by $^{13}$C-NMR, $^{1}$H-NMR and GPC and characterized as described below.

Silicone-pendant urethane-(meth)acrylate-2 to 7 and Comparative urethane-(meth)acrylate-1 were synthesized by the same method as described above wherein Hydroxy compound, Silicon-containing compound, Isocyanate compound and catalyst were mixed to react.

The following are Silicone-pendant urethane-(meth)acrylate-1 to 7 and Comparative urethane-(meth)acrylate-1 blended to compositions for forming a stretchable film as a compound having a (meth)acrylate group at the terminal.

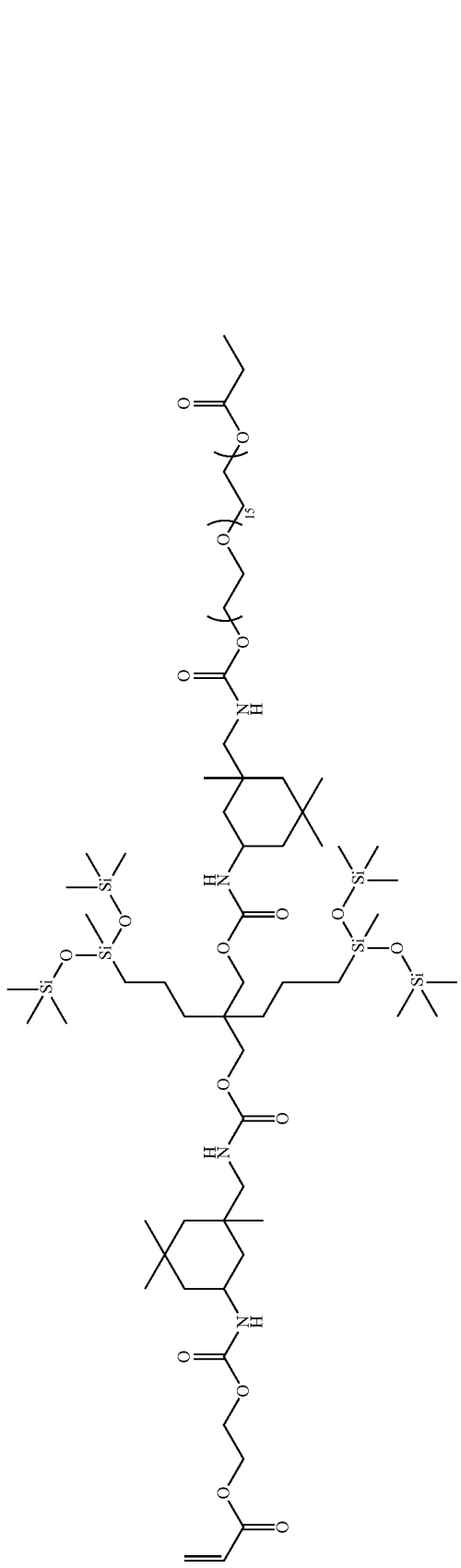
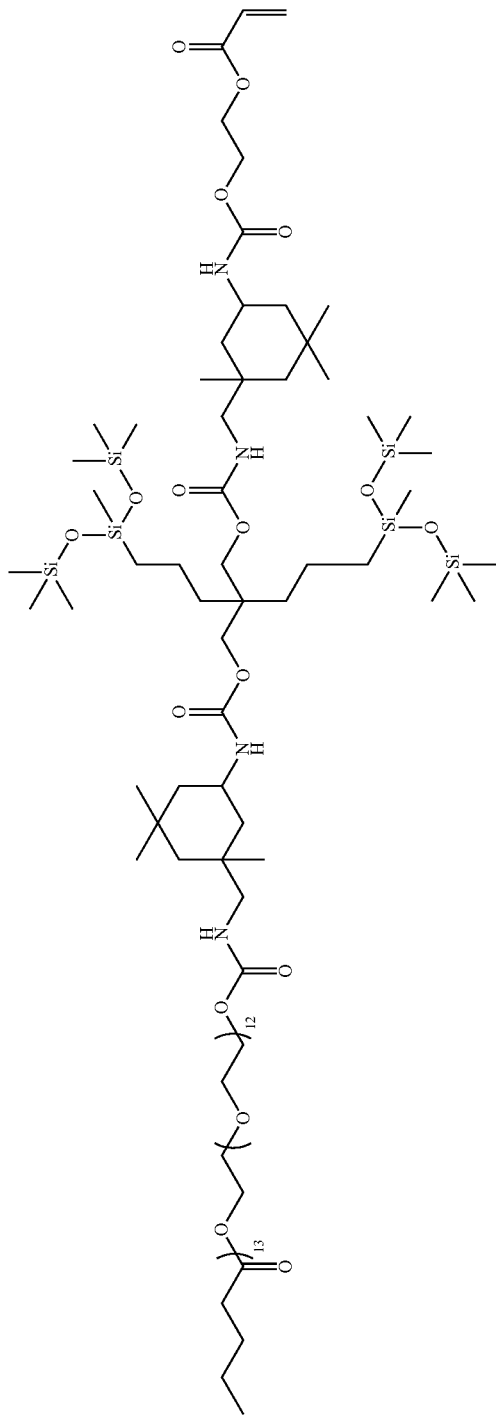
Silicone-pendant urethane-(meth)acrylate-5
Mw 8200 Mw/Mn 2.56

-continued
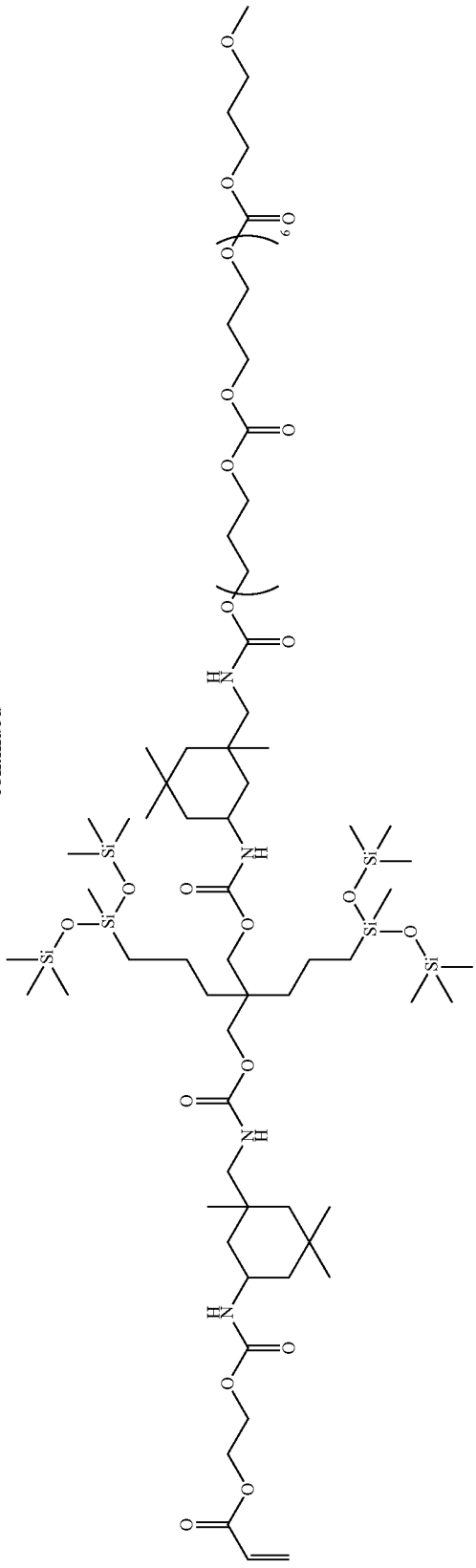
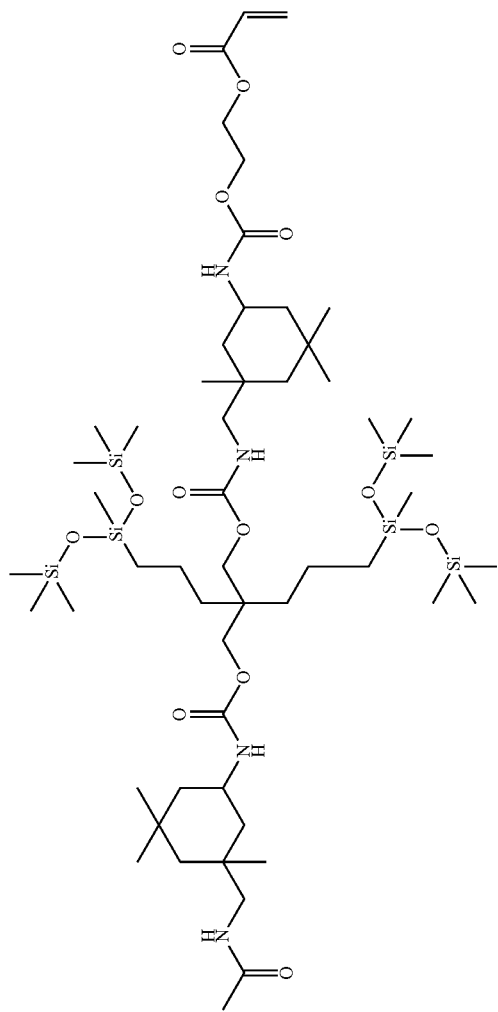
Silicone-pendant urethane-(meth)acrylate-7 Mw 6500 Mw/Mn 1.95

-continued
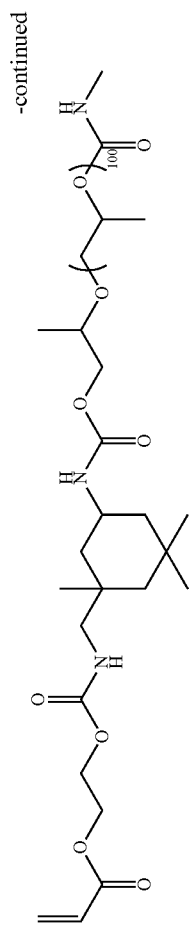
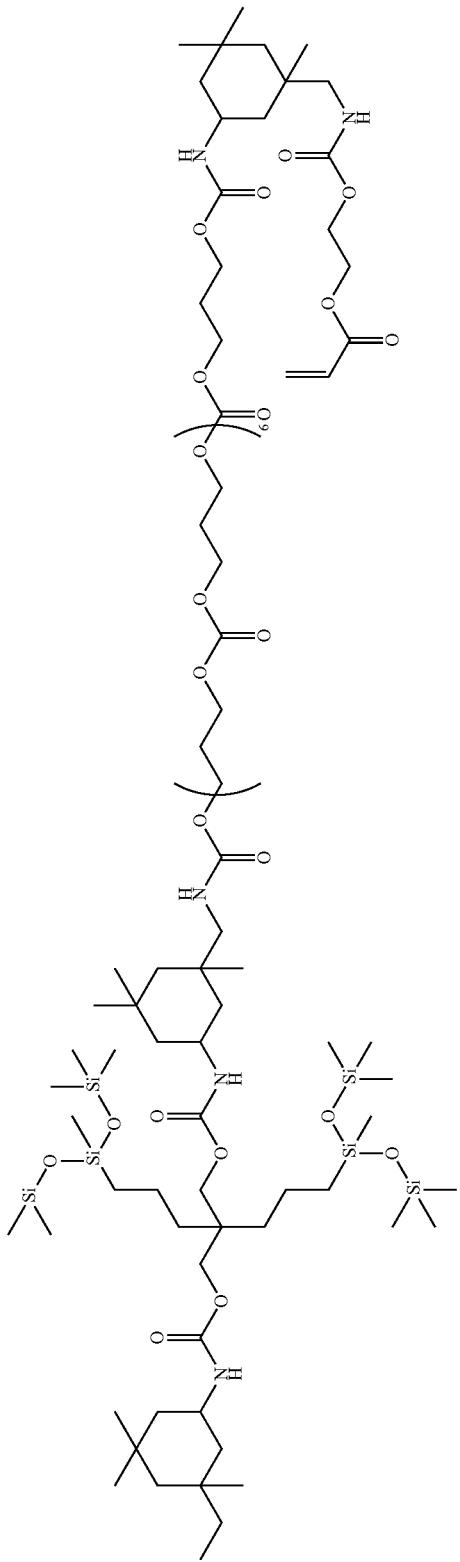
Silicone-pendant
urethane-(meth)acrylate-1
Mw 12100, Mw/Mn 2.33

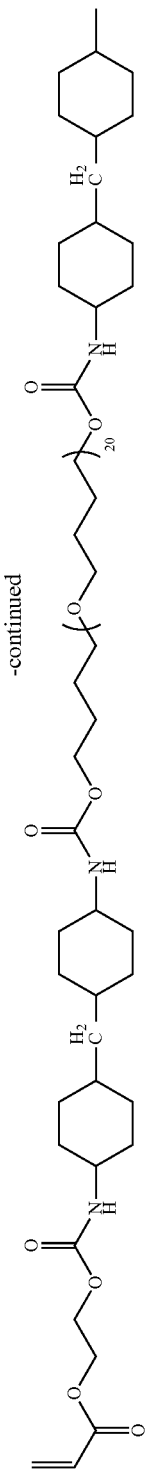
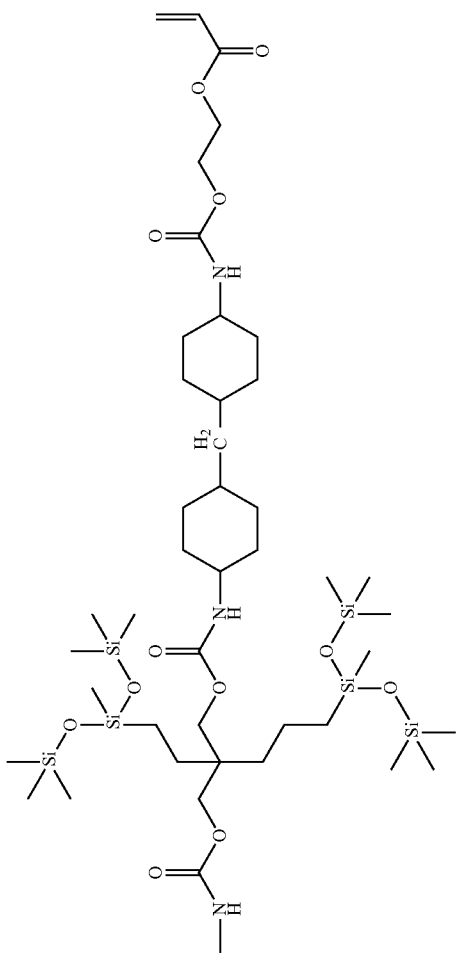
Silicone-pendant urethane-(meth)acrylate-2
Mx 10200, Mw/Mn 2.26

-continued
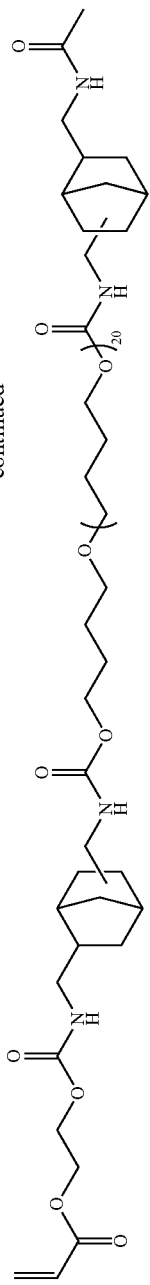
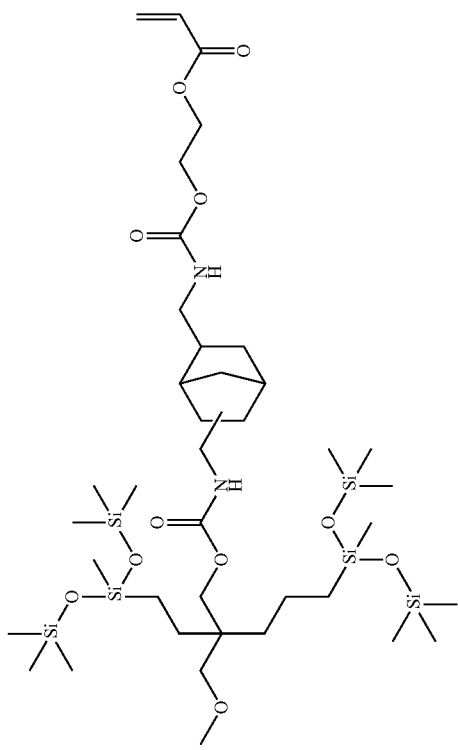
Silicone-pendant
urethane-(eth)acrylate-3
Mw 9600, Mw/Mn 2.10

-continued
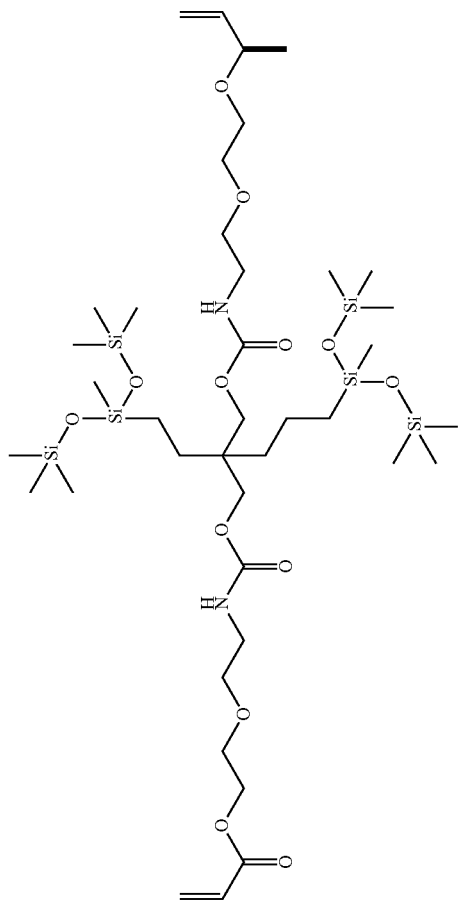
Silicone-pendant
urethane-(meth)acrylate-5
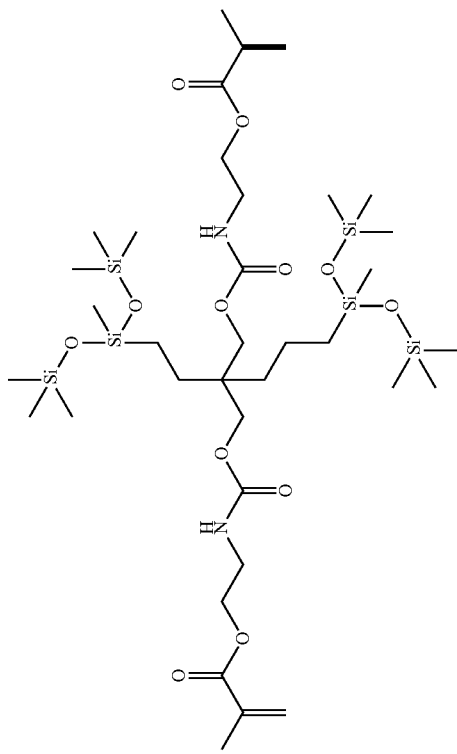
Silicone-pendant
urethane-(meth)acrylate-4

(In the formulae, the numbers of repeating unit each represent the average value, $t^1+t^2$ is 20 on average, and $t^3$ is 10 on average.)

The following are Photo-radical generators-1 to 3 and Thermal-radical generator-1 blended to compositions for forming a stretchable film as an additive.
Photo-radical generator-1: 4,4'-dimethoxybenzyl
Photo-radical generator-2: 2,2-dimethoxy-2-phenylacetophenone
Photo-radical generator-3: (±)-camphorquinone
Thermal-radical generator-1: dimethyl 2,2'-azobis(2-methylpropionate)

The following is an organic solvent blended to compositions for forming a stretchable film.
Organic solvent: propylene glycol monomethyl ether acetate (PGMEA)

Examples 1-1 to 1-6, Comparative Example 1-1

The silicon-containing compound, the isocyanate compound, the hydroxy compounds and the catalyst were mixed in each composition described in Table 1. This was defoamed to prepare a composition for forming a stretchable film (Stretchable film materials 1-1 to 1-6, Comparative stretchable film material 1-1). After the defoaming, each of Stretchable film materials 1-1 to 1-6 and Comparative stretchable film material 1-1 was applied onto a polyethylene substrate by bar coating method, followed by baking at 130° C. for 20 minutes in a nitrogen atmosphere to produce a stretchable film (Films 1-1 to 1-6, Comparative Film 1-1) on the substrate. The ratio of molar numbers of hydroxy groups and isocyanate groups in each composition for forming a stretchable film is shown in Table 1.

Examples 2-1 to 2-6, Comparative Example 2-1

Each of the compound having a (meth)acrylate group at the terminal, Photo-radical generators-1 to 3, and Thermal-radical generator-1 was mixed in the composition described in Table 2 to prepare a composition for forming a stretchable film (Stretchable film materials 2-1 and 2-4 to 2-6, Comparative stretchable film material 2-1). In Stretchable film material 2-1 and Comparative stretchable film material 2-1, isobornyl acrylate was blended as a monomer having a (meth)acrylate group. Each prepared composition for forming a stretchable film was applied onto a polyethylene substrate by bar coating method. In cases of Stretchable film materials 2-1 to 2-5 and Comparative stretchable film material 2-1, the coated film of each composition was cured by irradiation of 500 mJ/cm$^2$ of light with a 1,000 W xenon lamp in a nitrogen atmosphere to produce a stretchable film (Films 2-1 to 2-5, Comparative Film 2-1). In case of stretchable film material 2-6, the prepared compositions for forming a stretchable film was applied onto a polyethylene substrate by bar coating method, followed by baking at 120° C. for 20 minutes in a nitrogen atmosphere to produce a stretchable film (Film 2-6).

TABLE 1

| Stretchable film material | Silicon-containing compound (parts by mass) | Isocyanate compound (parts by mass) | Hydroxy compounds (parts by mass) | Catalyst (parts by mass) | Molar ratio hydroxy/isocyanate |
|---|---|---|---|---|---|
| Stretchable film material 1-1 | Silicon-containing compound-1 (3) | Isocyanate compound-1 (11) | Hydroxy compound-1 (5) Hydroxy compound-2 (1) Hydroxy compound-4 (10) Hydroxy compound-8 (5) | Dibutyltin dilaurate (0.01) | 1.06 |
| Stretchable film material 1-2 | Silicon-containing compound-2 (3) | Isocyanate compound-2 (6) | Hydroxy compound-5 (15) Hydroxy compound-3 (0.5) Hydroxy compound-8 (9) | Dibutyltin dilaurate (0.01) | 1.08 |
| Stretchable film material 1-3 | Silicon-containing compound-3 (5) | Isocyanate compound-3 (6) | Hydroxy compound-6 (28) Hydroxy compound-3 (0.5) | Dibutyltin dilaurate (0.01) | 1.05 |
| Stretchable film material 1-4 | Silicon-containing compound-4 (5) | Isocyanate compound-3 (8) | Hydroxy compound-6 (25) Hydroxy compound-7 (3) Hydroxy compound-3 (0.5) | Dibutyltin dilaurate (0.01) | 1.05 |
| Stretchable film material 1-5 | Silicon-containing compound-4 (5) | Isocyanate compound-4 (16) | Hydroxy compound-6 (20) Hydroxy compound-7 (2.5) | Dibutyltin dilaurate (0.01) | 1.05 |
| Stretchable film material 1-6 | Silicon-containing compound-4 (5) | Isocyanate compound-5 (15) | Hydroxy compound-6 (20) Hydroxy compound-7 (4) | Dibutyltin dilaurate (0.01) | 1.02 |
| Comparative stretchable film material 1-1 | Comparative silicone-pendant diol compound-1 (5) | Isocyanate compound-1 (11) | Hydroxy compound-1 (5) Hydroxy compound-2 (1) Hydroxy compound-4 (8) Hydroxy compound-8 (3) | Dibutyltin dilaurate (0.01) | 1.05 |

TABLE 2

| Stretchable film material | Compound having (meth)acrylate group (parts by mass) | Additive (parts by mass) |
|---|---|---|
| Stretchable film material 2-1 | Silicone-pendant urethane-(meth)acrylate-1 (70) Isobornyl acrylate (30) | Photo-radical generator-1 (3) |
| Stretchable film material 2-2 | Silicone-pendant urethane-(meth)acrylate-2 (85) Silicone-pendant urethane-(meth)acrylate-4 (15) | Photo-radical generator-2 (3) |
| Stretchable film material 2-3 | Silicone-pendant urethane-(meth)acrylate-3 (75) Silicone-pendant urethane-(meth)acrylate-5 (25) | Photo-radical generator-3 (3) |
| Stretchable film material 2-4 | Silicone-pendant urethane-(meth)acrylate-1 (60) Silicone-pendant urethane-(meth)acrylate-6 (40) Isobornyl acrylate (30) | Photo-radical generator-3 (3) |
| Stretchable film material 2-5 | Silicone-pendant urethane-(meth)acrylate-2 (70) Silicone-pendant urethane-(meth)acrylate-7 (30) Isobornyl acrylate (30) | Photo-radical generator-3 (3) |
| Stretchable film material 2-6 | Silicone-pendant urethane-(meth)acrylate-2 (70) Silicone-pendant urethane-(meth)acrylate-7 (30) Isobornyl acrylate (30) | Thermal-radical generator-1 (3) |
| Comparative stretchable film material 2-1 | Comparative urethane-(meth)acrylate-1 (70) Isobornyl acrylate (30) | Photo-radical generator-1 (3) |

(Measurement of Film Thickness, Contact Angle, Stretching Property, and Strength)

The film thickness was measured on each stretchable film after curing, together with contact angle with water on the surface thereof. After measuring the contact angle with water on the surface of the stretchable film, the stretchable film was peeled from the substrate, and subjected to measurement of the stretching property (elongation) and strength in conformity to JIS K 6251. The results are shown in Table 3.

TABLE 3

| | Stretchable film | Stretchable film material | Film thickness (μm) | Contact angle (°) | Elongation (%) | Strength (MPa) |
|---|---|---|---|---|---|---|
| Example 1-1 | Film 1-1 | Stretchable film material 1-1 | 330 | 103 | 300 | 12.7 |
| Example 1-2 | Film 1-2 | Stretchable film material 1-2 | 340 | 104 | 410 | 11.3 |
| Example 1-3 | Film 1-3 | Stretchable film material 1-3 | 330 | 104 | 390 | 12.3 |
| Example 1-4 | Film 1-4 | Stretchable film material 1-4 | 366 | 103 | 250 | 15.7 |
| Example 1-5 | Film 1-5 | Stretchable film material 1-5 | 360 | 104 | 350 | 15.3 |
| Example 1-6 | Film 1-6 | Stretchable film material 1-6 | 370 | 104 | 370 | 16.3 |
| Example 2-1 | Film 2-1 | Stretchable film material 2-1 | 290 | 102 | 390 | 13.1 |
| Example 2-2 | Film 2-2 | Stretchable film material 2-2 | 280 | 103 | 220 | 12.3 |
| Example 2-3 | Film 2-3 | Stretchable film material 2-3 | 410 | 103 | 270 | 11.8 |
| Example 2-4 | Film 2-4 | Stretchable film material 2-4 | 360 | 105 | 250 | 15.7 |
| Example 2-5 | Film 2-5 | Stretchable film material 2-5 | 360 | 105 | 180 | 19.4 |
| Example 2-6 | Film 2-6 | Stretchable film material 2-6 | 290 | 105 | 160 | 21.2 |
| Comparative Example 1-1 | Comparative Film 1-1 | Comparative stretchable film material 1-1 | 300 | 93 | 350 | 2.3 |
| Comparative Example 2-1 | Comparative Film 2-1 | Comparative stretchable film material 2-1 | 330 | 81 | 410 | 1.1 |

As shown in Table 3, each stretchable film exhibited higher contact angle with water, that is, high repellency, together with excellent stretchability and strength in Examples 1-1 to 1-6, in which a diol compound having two pendant silicon-containing groups reacted with an isocyanate compound, and in Examples 2-1 to 2-6, in which a compound having two pendant silicon-containing groups was used as a compound having a (meth)acrylate group at the terminal.

On the other hand, the stretchable film in Comparative Example 2-1, in which a compound without having a siloxane bond was used as a compound having a (meth)acrylate group at the terminal, exhibited lower contact angle with water, that is, lower water repellency, and inferior strength compared to Examples 1-1 to 1-6 and 2-1 to 2-6.

The stretchable film in Comparative Example 1-1, in which the conventional diol compound having a linear pendant silicone reacted with an isocyanate compound, exhibited inferior strength, particularly compared to that of Example 1-1, in which the composition was same except for the silicon-containing groups, although the contact angle with water was high.

From the above, it was revealed that the inventive stretchable film has excellent stretching property and strength, together with excellent water repellency on the film surface, and has excellent properties as a film to coat stretchable wiring used for a wearable device, etc. thereby.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A silicon-containing compound shown by the following formula (2):

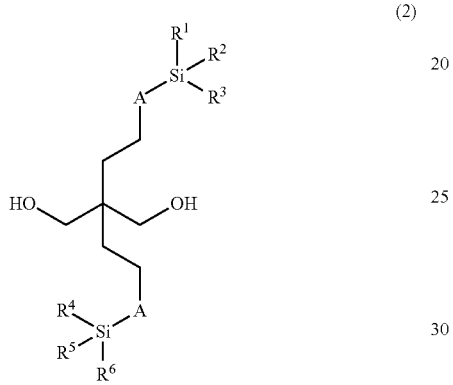

(2)

wherein
$R^1, R^2, R^3, R^4, R^5$, and $R^6$ each independently represent a linear, branched, or cyclic alkyl group having 1 to 6 carbon atoms, a phenyl group, a 3,3,3-trifluoropropyl group, or a group shown by $—(OSiR^7R^8)_n—OSiR^9R^{10}R^{11}$;
$R^7, R^8, R^9, R^{10}$, and $R^{11}$ have the same meanings as $R^1$ to $R^6$;
"n" is an integer in the range of 0 to 100; and
"A" represents a linear or branched alkylene group having 1 to 4 carbon atoms.

2. The silicon-containing compound according to claim 1, wherein the silicon-containing compound of the formula (2) is shown by the following formula (3)

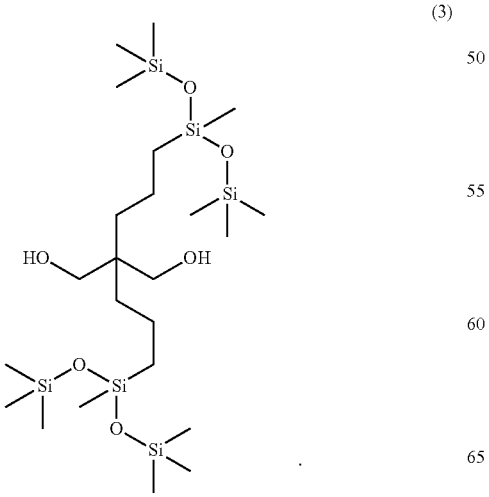

(3)

3. A urethane resin comprising a structure shown by the following formula (5):

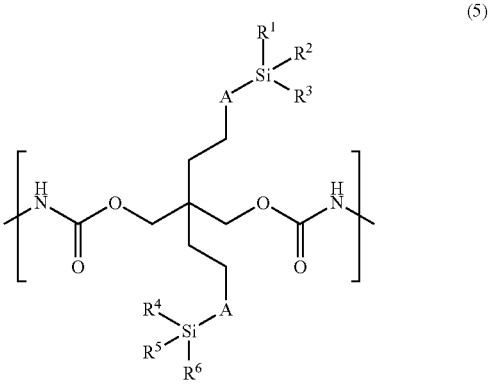

(5)

wherein
$R^1, R^2, R^3, R^4, R^5$, and $R^6$ each independently represent a linear, branched, or cyclic alkyl group having 1 to 6 carbon atoms, a phenyl group, a 3,3,3-trifluoropropyl group, or a group shown by $—(OSiR^7R^8)_n—OSiR^9R^{10}R^{11}$;
$R^7, R^8, R^9, R^{10}$, and $R^{11}$ have the same meanings as $R^1$ to $R^6$;
"n" is an integer in the range of 0 to 100; and
"A" represents a linear or branched alkylene group having 1 to 4 carbon atoms.

4. The urethane resin according to claim 3, having a structure containing a (meth)acrylate group at a terminal thereof shown by the following formula (6):

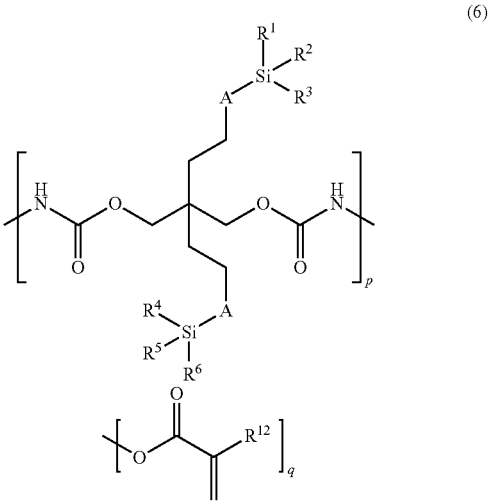

(6)

wherein $R^1, R^2, R^3, R^4, R^5, R^6$, and "A" have the same meanings as defined above; $R^{12}$ represents a hydrogen atom or a methyl group; "p" and "q" each represent a number of unit in one molecule, and are integers in the range of $1 \leq p \leq 100$ and $1 \leq q \leq 3$.

5. A stretchable film comprising a cured material of a composition containing the urethane resin according to claim 4.

6. The stretchable film according to claim 5, wherein the stretchable film is used as a film to be in contact with a conductive wiring having stretchability.

7. The stretchable film according to claim 5, wherein the stretchable film exhibits a stretching property of 40 to 1000% in a tensile test regulated by JIS K 6251.

8. A stretchable film comprising a cured material of a composition containing the urethane resin according to claim 3.

9. The stretchable film according to claim 8, wherein the stretchable film is used as a film to be in contact with a conductive wiring having stretchability.

10. The stretchable film according to claim 8, wherein the stretchable film exhibits a stretching property of 40 to 1000% in a tensile test regulated by JIS K 6251.

11. A method for forming a stretchable film, comprising:

mixing a compound shown by the following formula (2) and a compound having an isocyanate group to make a mixture,

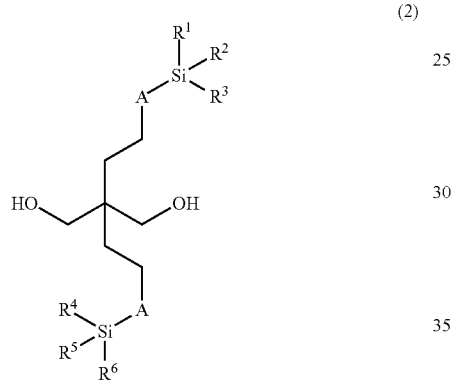

(2)

wherein $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by —$(OSiR^7R^8)_n$—$OSiR^9R^{10}R^{11}$;

$R^7$, $R^8$, $R^9$, $R^{10}$, and $R^{11}$ have the same meanings as $R^1$ to $R^6$;

"n" is an integer in the range of 0 to 100; and

"A" represents a linear or branched alkylene group having 1 to 4 carbon atoms;

forming a film of the mixture; and curing the film by heating.

12. The method for forming a stretchable film according to claim 11, wherein the compound shown by the formula (2) is a compound shown by the following formula (3).

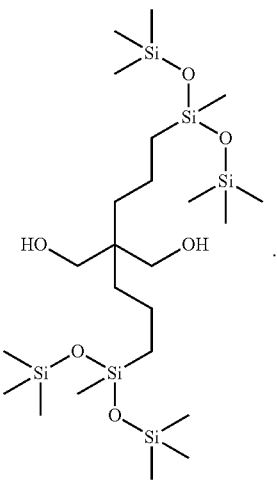

(3)

13. A method for forming a stretchable film, comprising:

forming a film of a compound having a (meth)acrylate group at a terminal thereof shown by the following formula (6):

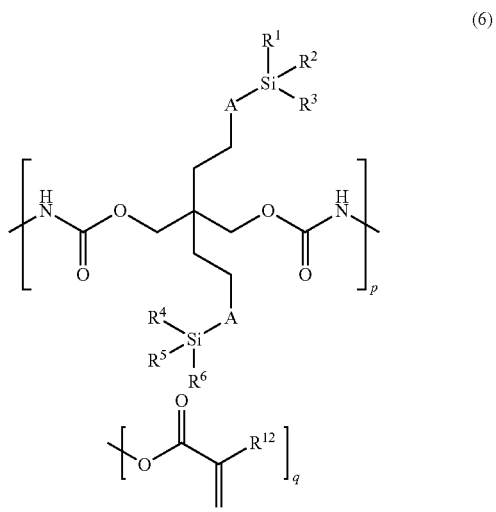

(6)

wherein $R^1$, $R^2$, $R^3$, $R^4$, $R^5$, and $R^6$ each independently represent a linear, branched, or cyclic alkyl group having 1 to 6 carbon atoms, a phenyl group, a 3,3,3-trifluoropropyl group, or a group shown by —$(OSiR^7R^8)_n$—$OSiR^9R^{10}R^{11}$; $R^7$, $R^8$, $R^9$, $R^{10}$, and $R^{11}$ have the same meanings as $R^1$ to $R^6$; "n" is an integer in the range of 0 to 100; "A" represents a linear or branched alkylene group having 1 to 4 carbon atoms; $R^{12}$ represents a hydrogen atom or a methyl group; "p" and "q" each represent a number of unit in one molecule, and are integers in the range of $1 \leq p \leq 100$ and $1 \leq q \leq 3$; and curing the film by heating and/or light irradiation.

* * * * *